United States Patent [19]

Shevlin

[11] 3,731,280
[45] May 1, 1973

[54] PROGRAMMABLE CONTROLLER

[75] Inventor: Robert Shevlin, Manhasset, N.Y.
[73] Assignee: Varisystems Corporations, Plainview, N.Y.
[22] Filed: Mar. 16, 1972
[21] Appl. No.: 235,202

[52] U.S. Cl. .............................. 340/172.5
[51] Int. Cl. .............................. G06f 9/06
[58] Field of Search .................. 340/172.5

[56] References Cited

UNITED STATES PATENTS

| | | | |
|---|---|---|---|
| 3,639,911 | 2/1972 | Frieband et al. | 340/172.5 |
| 3,602,889 | 8/1971 | Gayman et al. | 340/172.5 |
| 3,573,746 | 4/1971 | Robinson et al. | 340/172.5 |
| 3,573,853 | 4/1971 | Watson et al. | 340/172.5 |

OTHER PUBLICATIONS

"Digital Control Handbook," Digital Equipment Corp., pg. 361+ (1971).
"Modicon-The 084 Controller," Modicon Corp. copyright 1971.
"PDQ II-Solid State Programmabe Controller" Allen Bradley Co. Bulletin 1760, Sept. 1970.

Primary Examiner—Paul J. Henon
Assistant Examiner—Mark Edward Nusbaum
Attorney—Sidney G. Faber et al.

[57] ABSTRACT

A programmable controller for use in controlling a wide variety of external data and production devices and having an extremely flexible stored program capability enabling the device to function as a small-scale computer adapted for use as either a systems controller or as a "stand alone" mini-computer.

7 Claims, 26 Drawing Figures

United States Patent [19]
Shevlin
[11] 3,731,280
[45] May 1, 1973
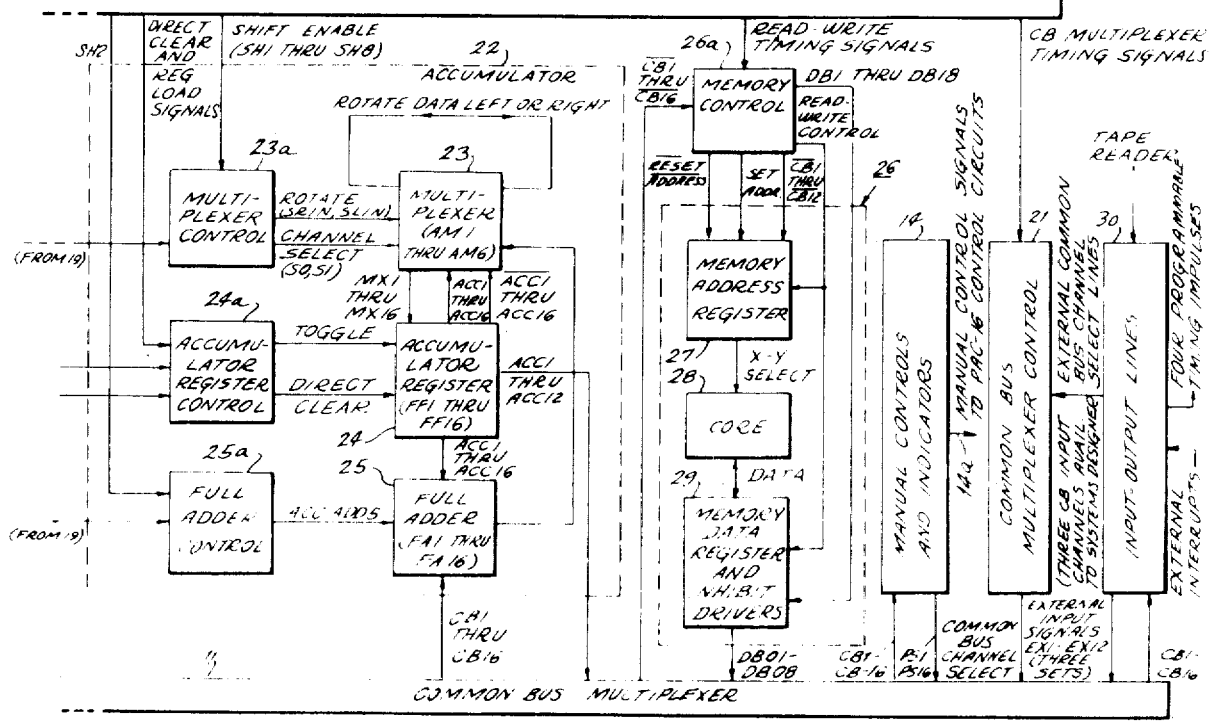

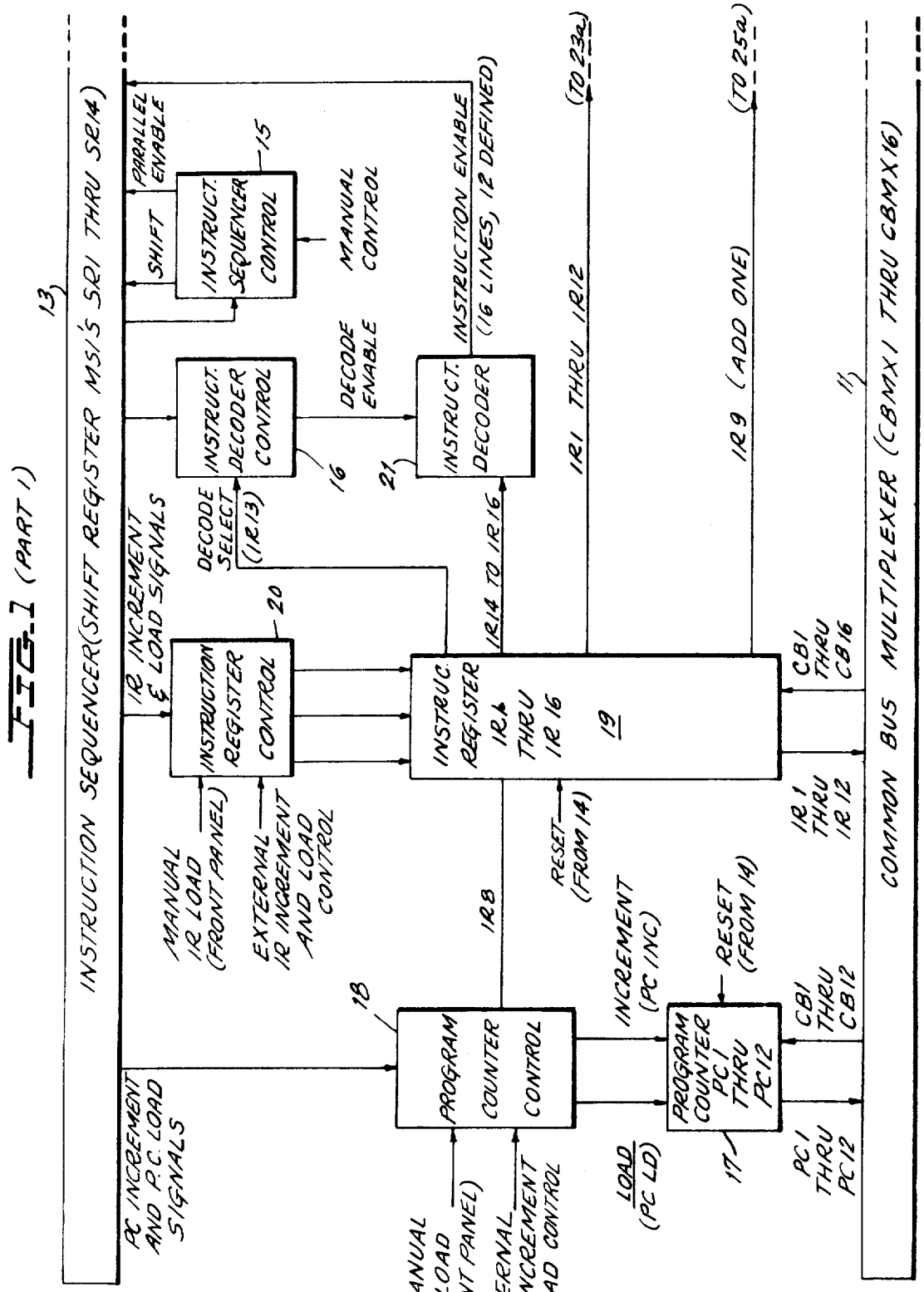

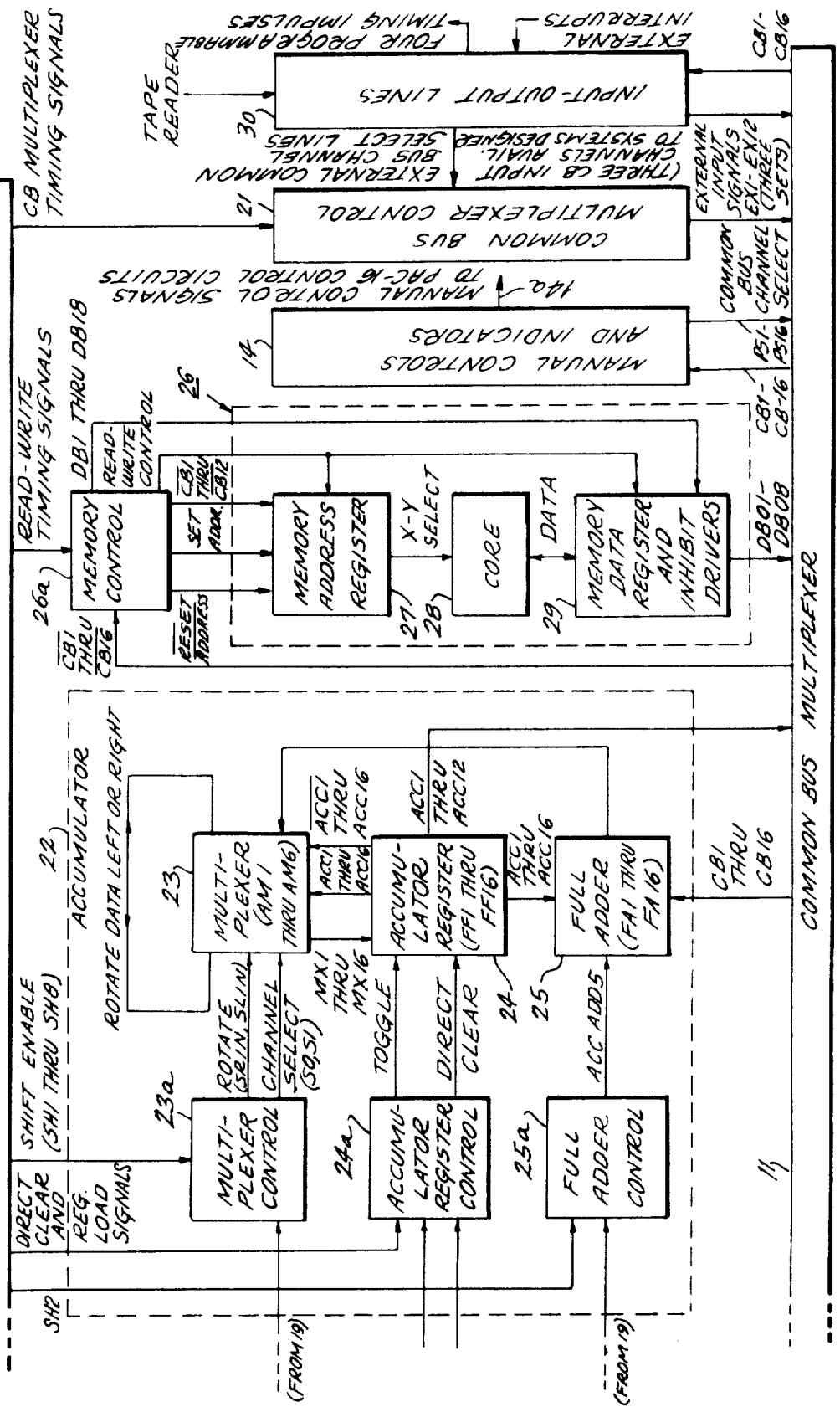

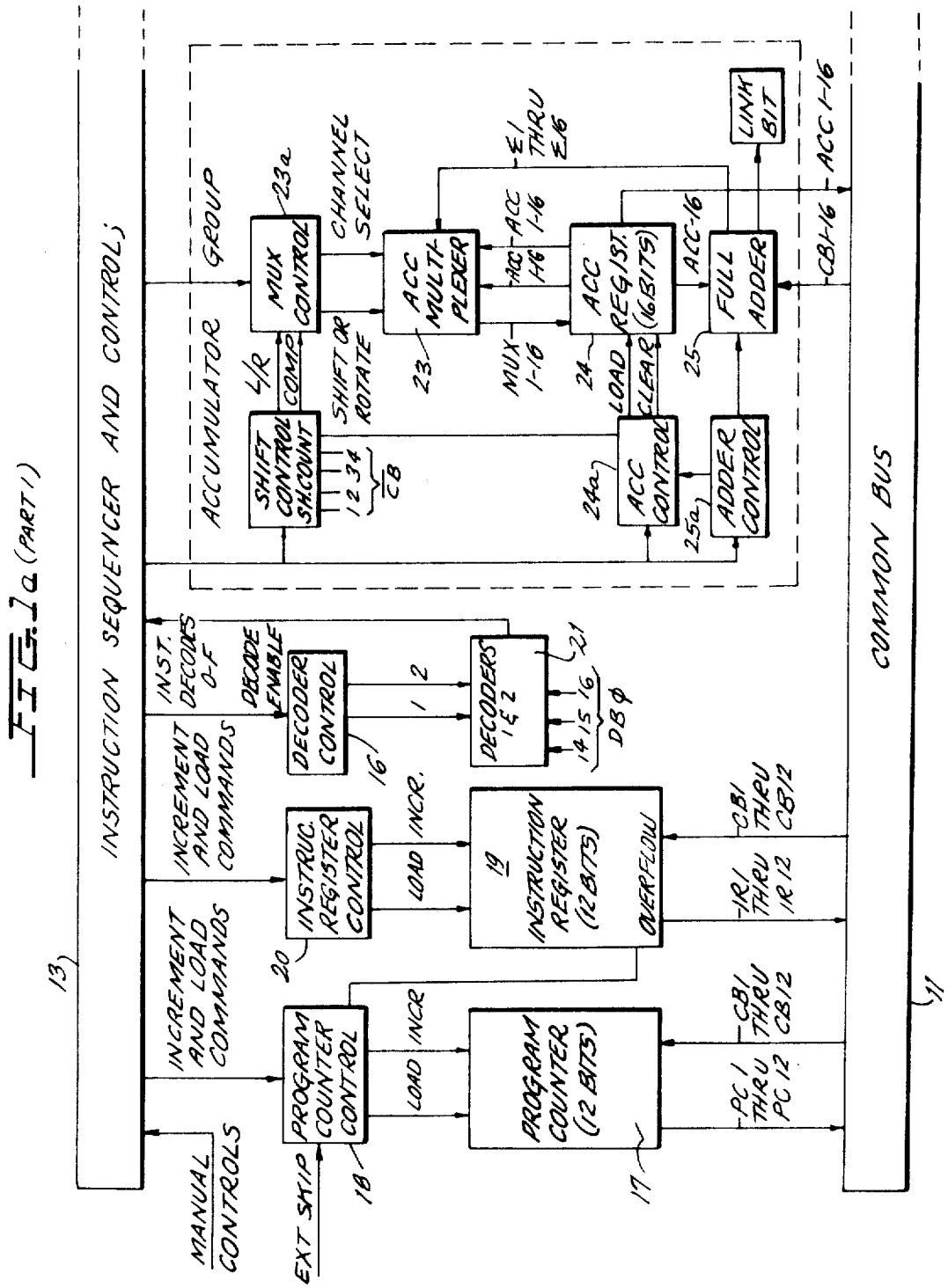

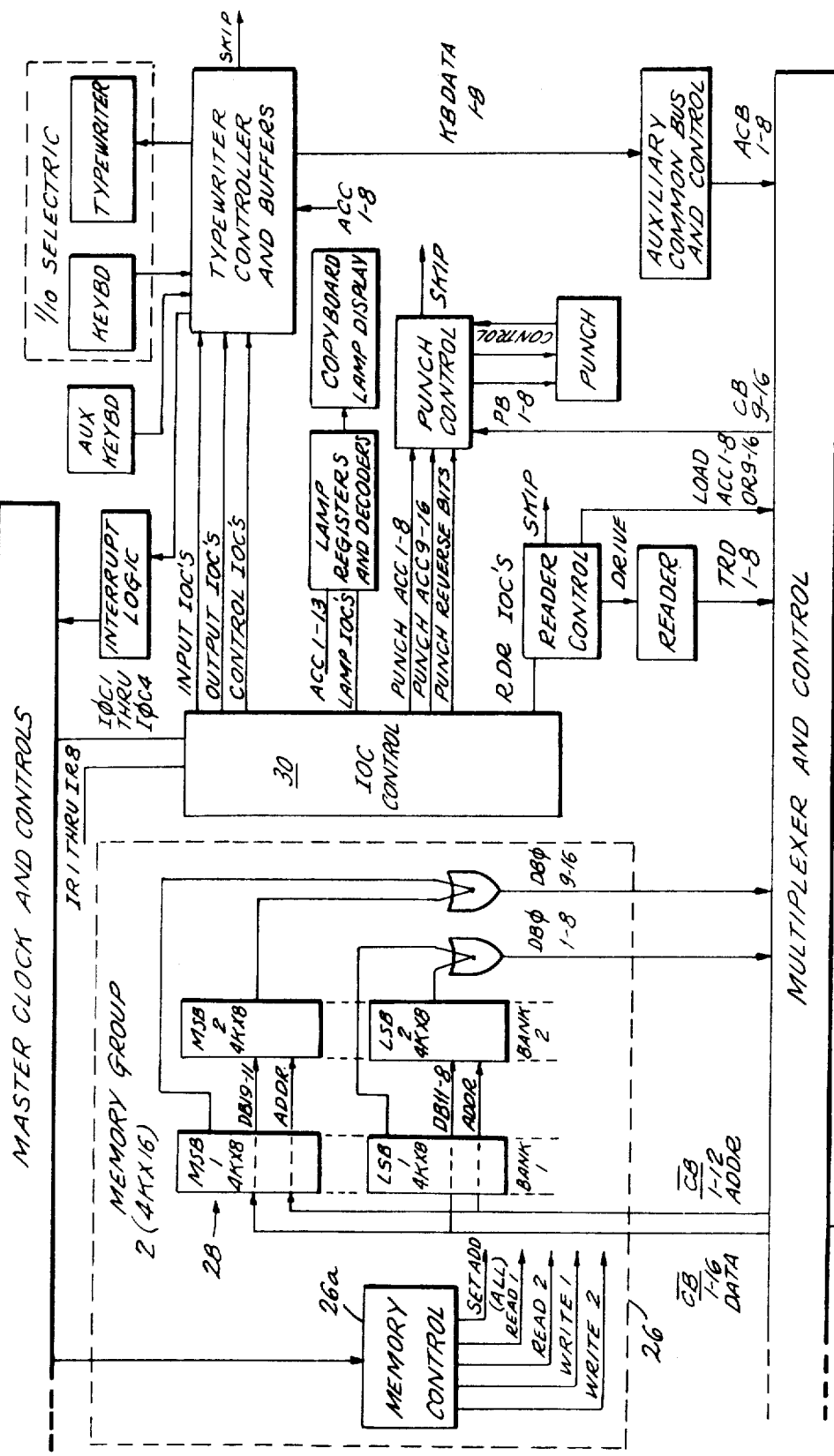

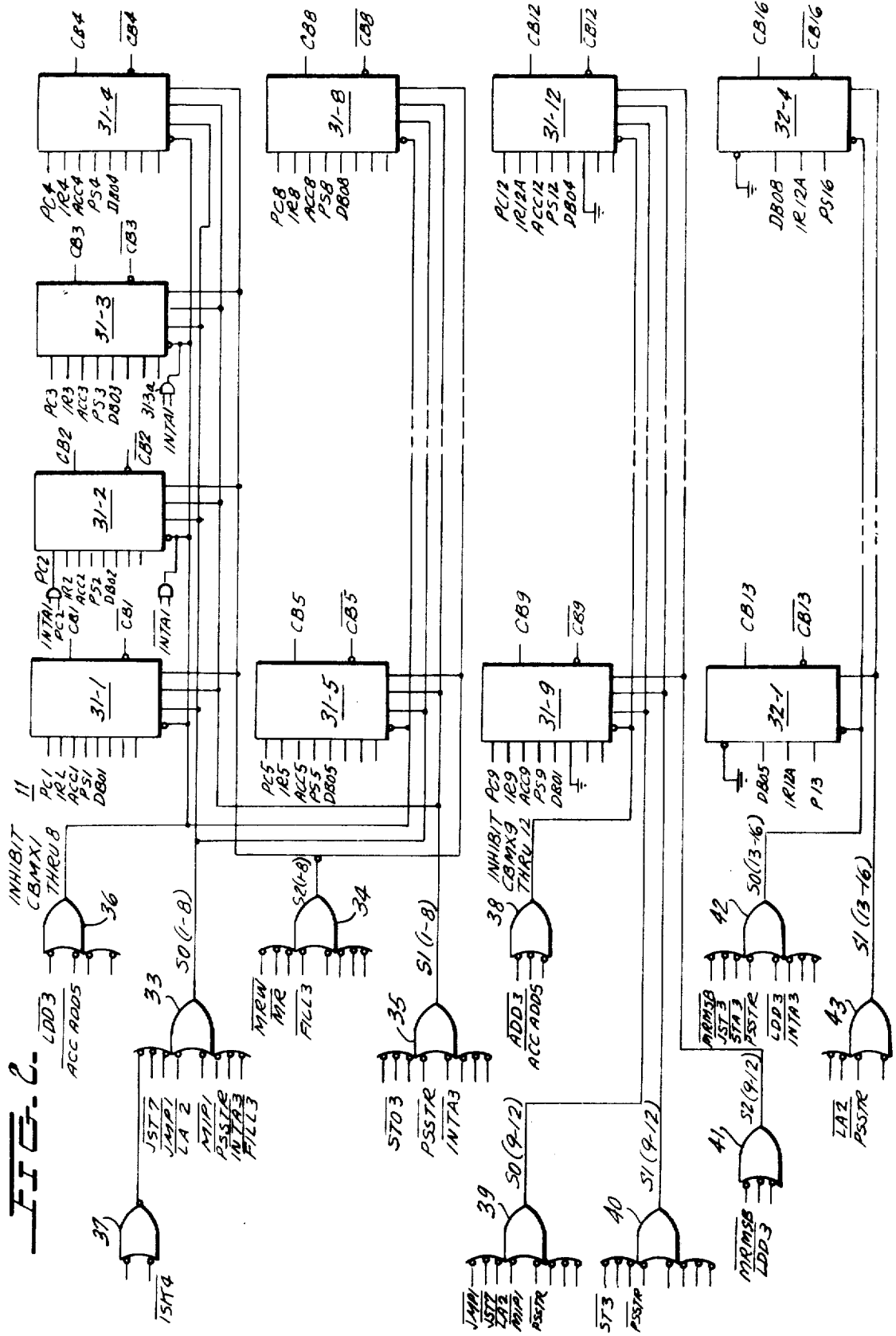

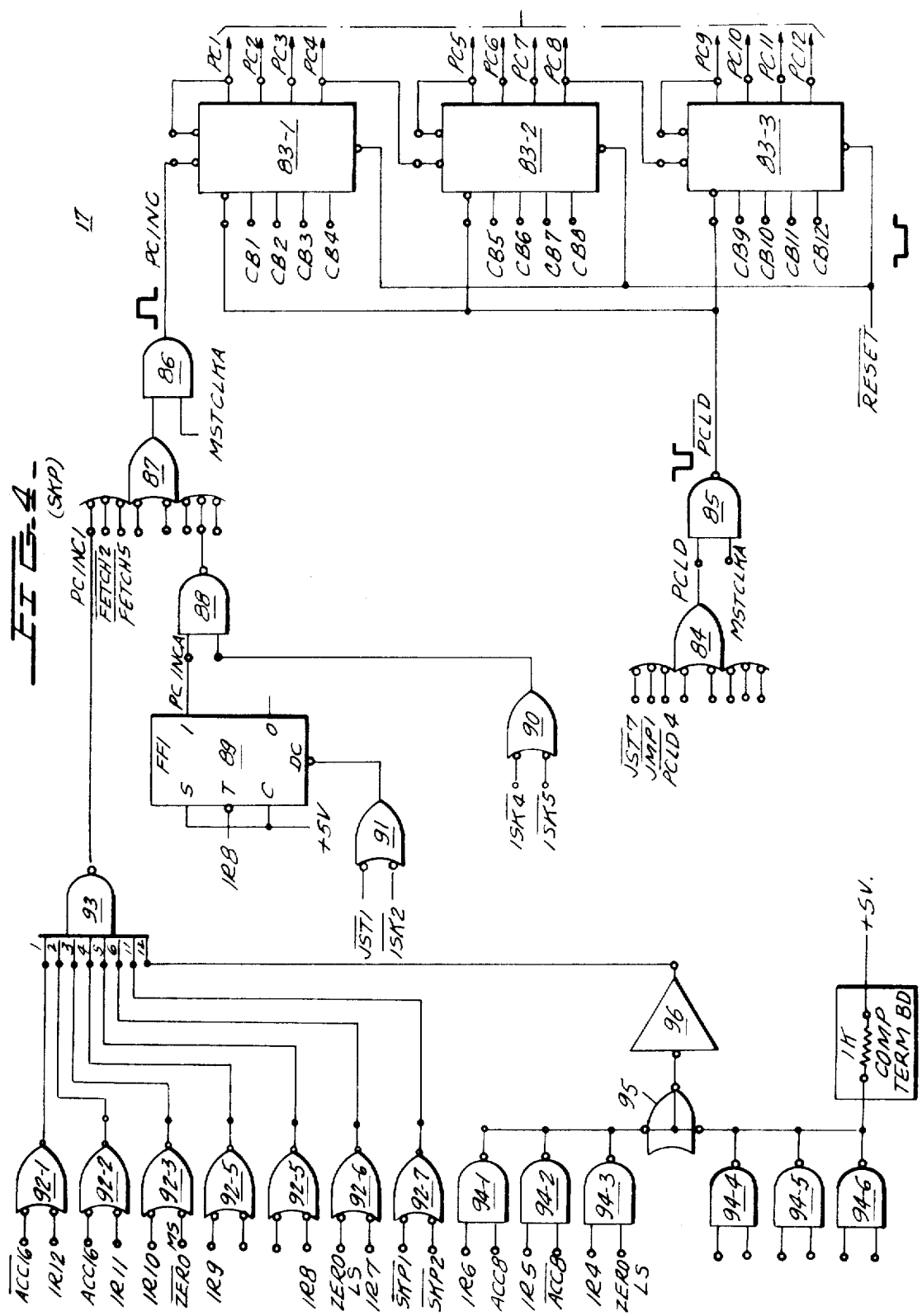

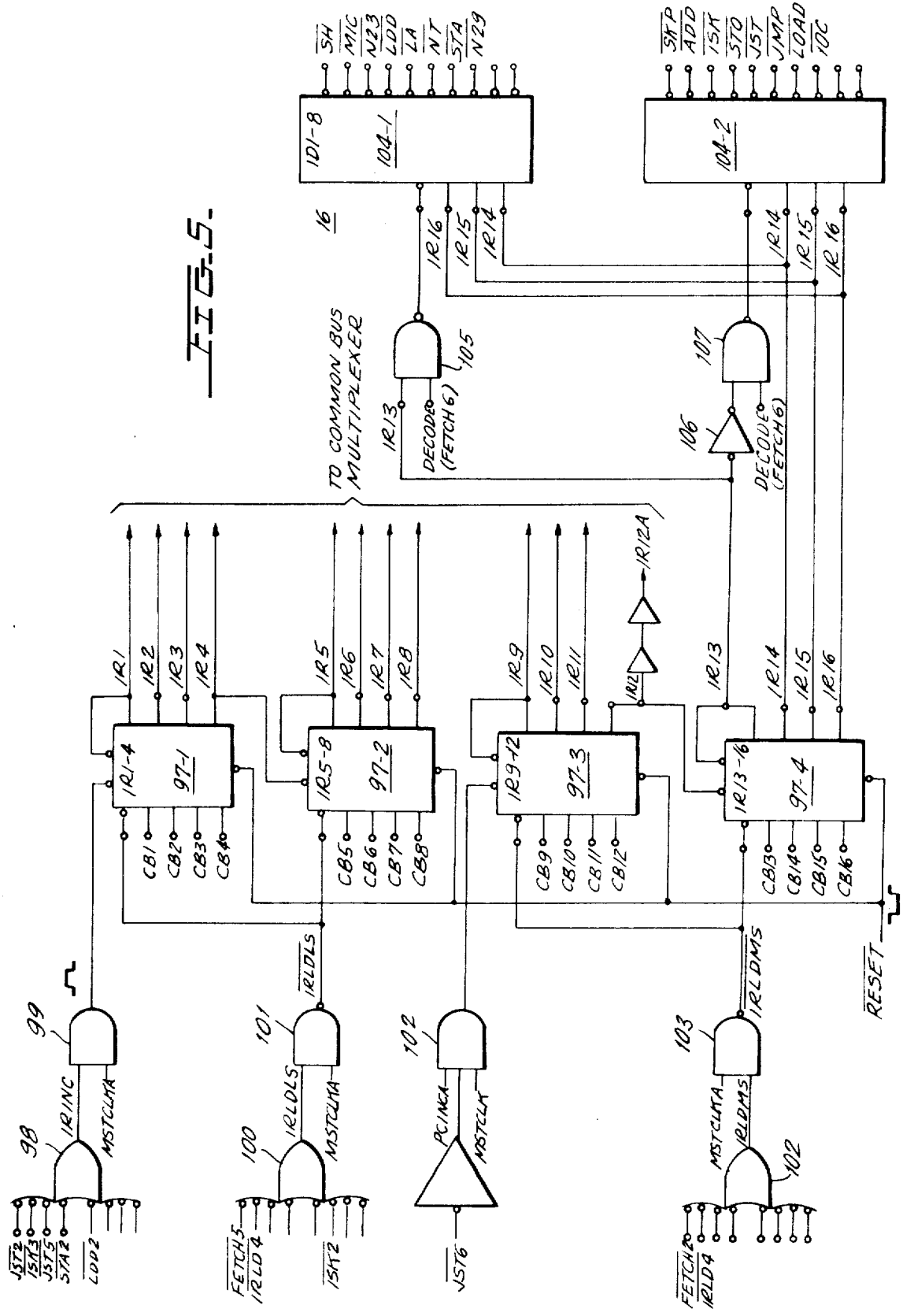

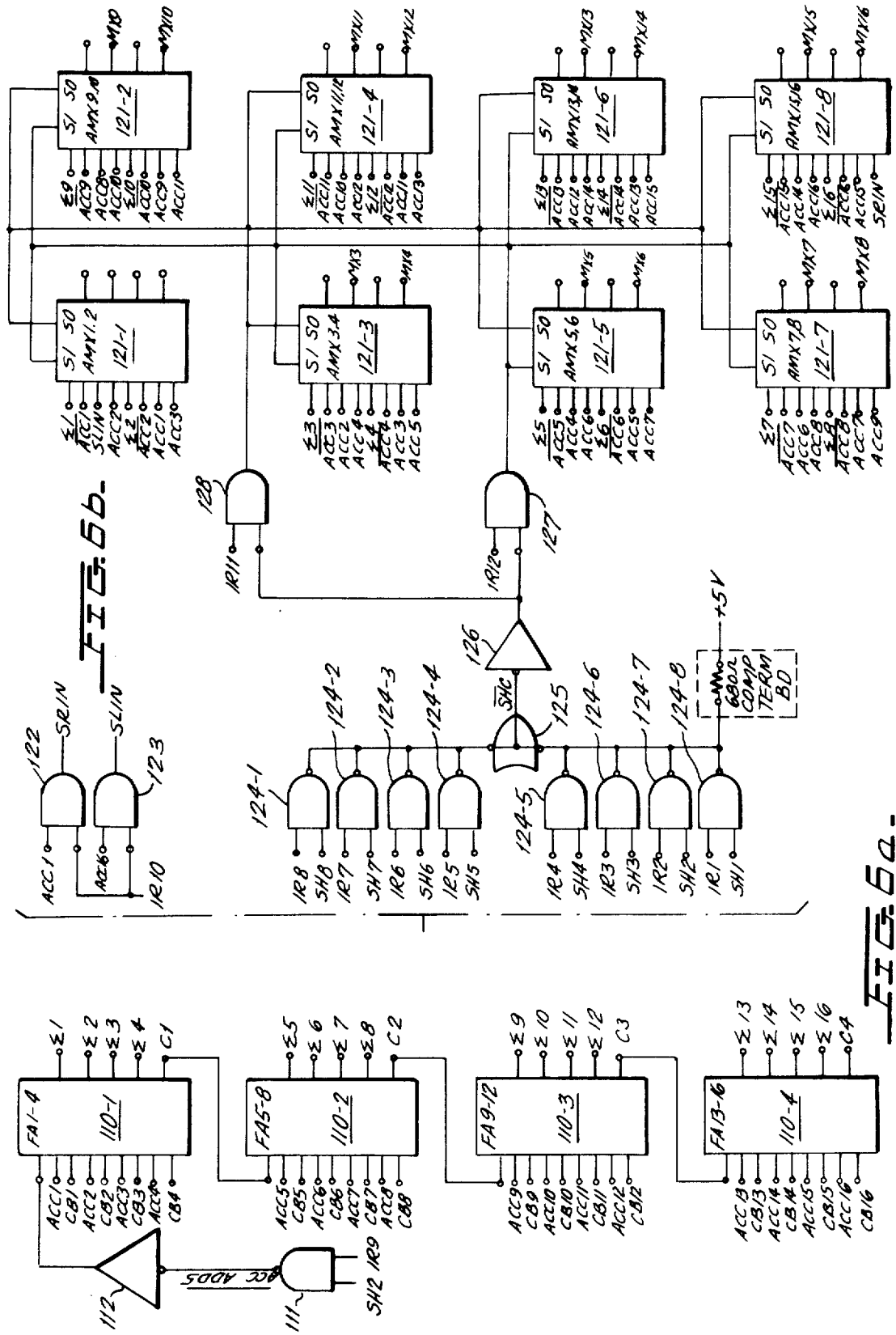

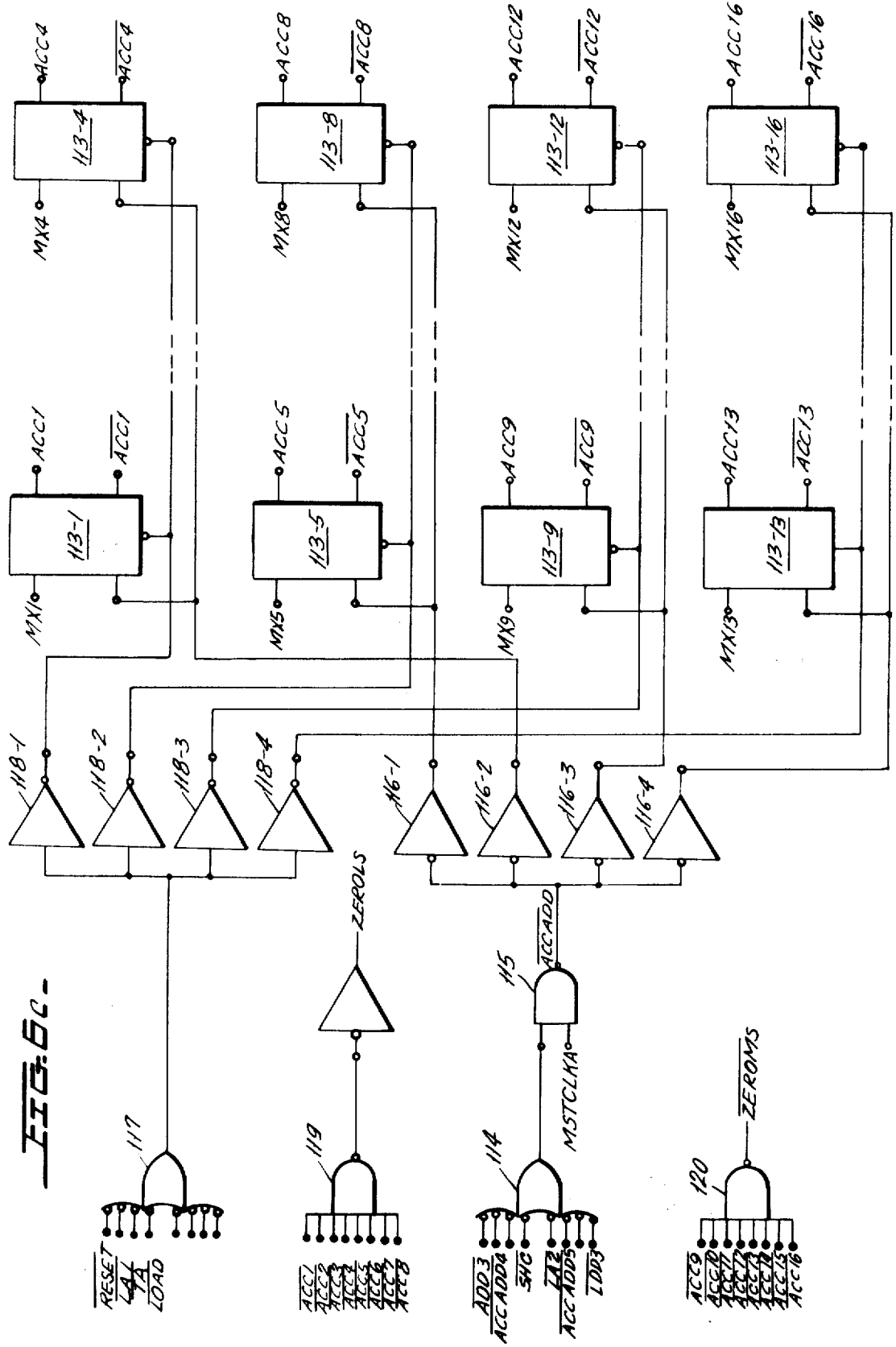

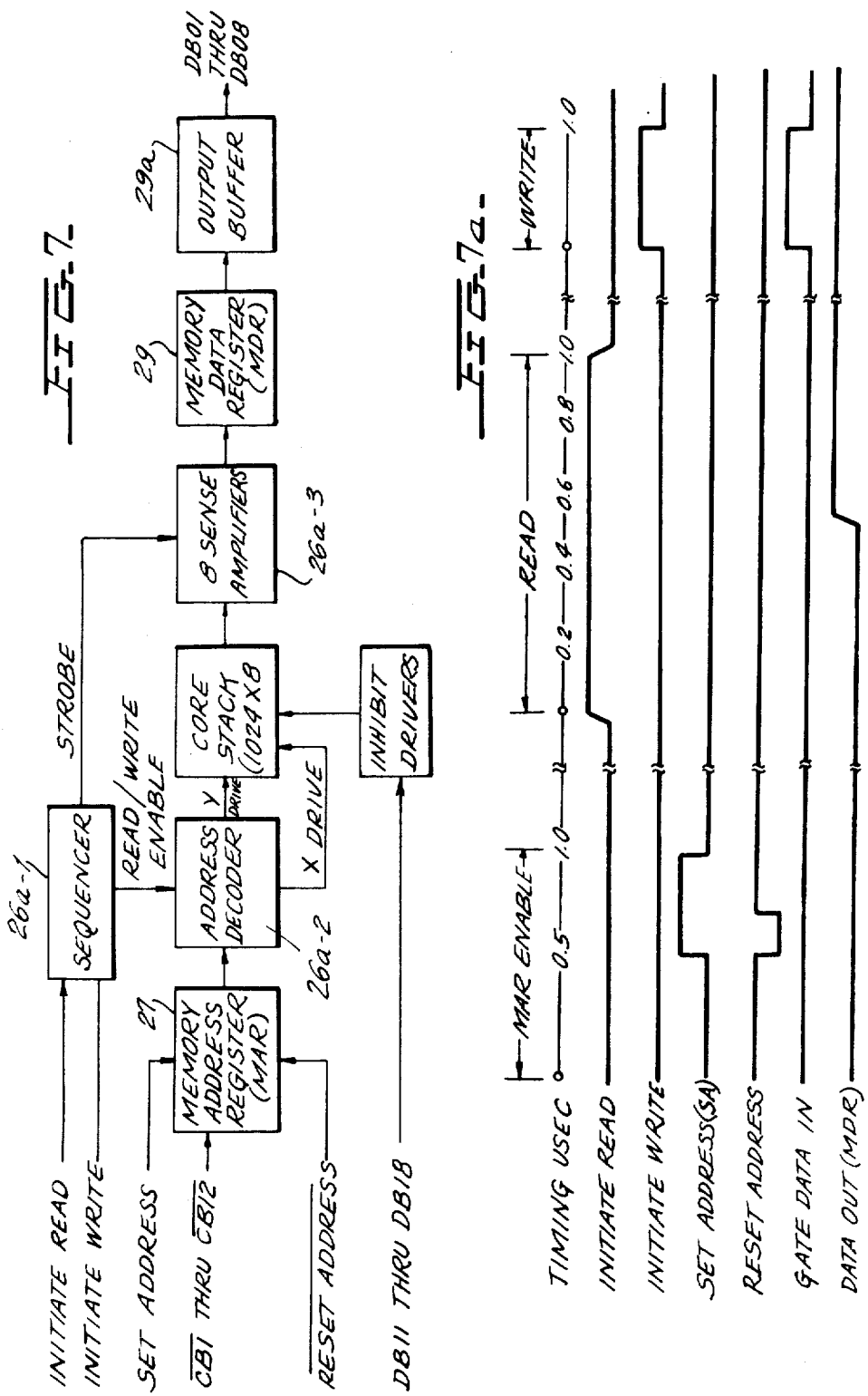

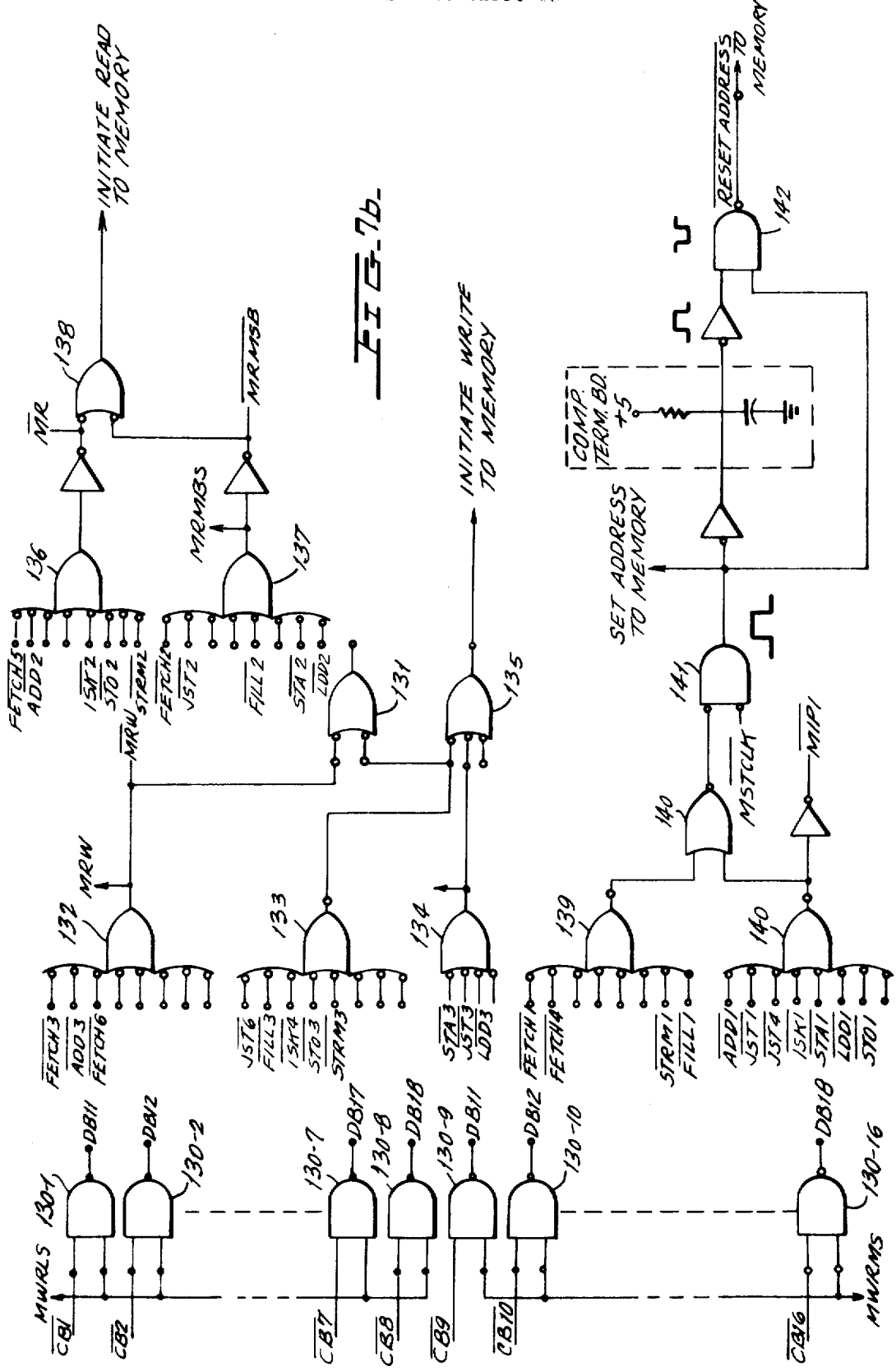

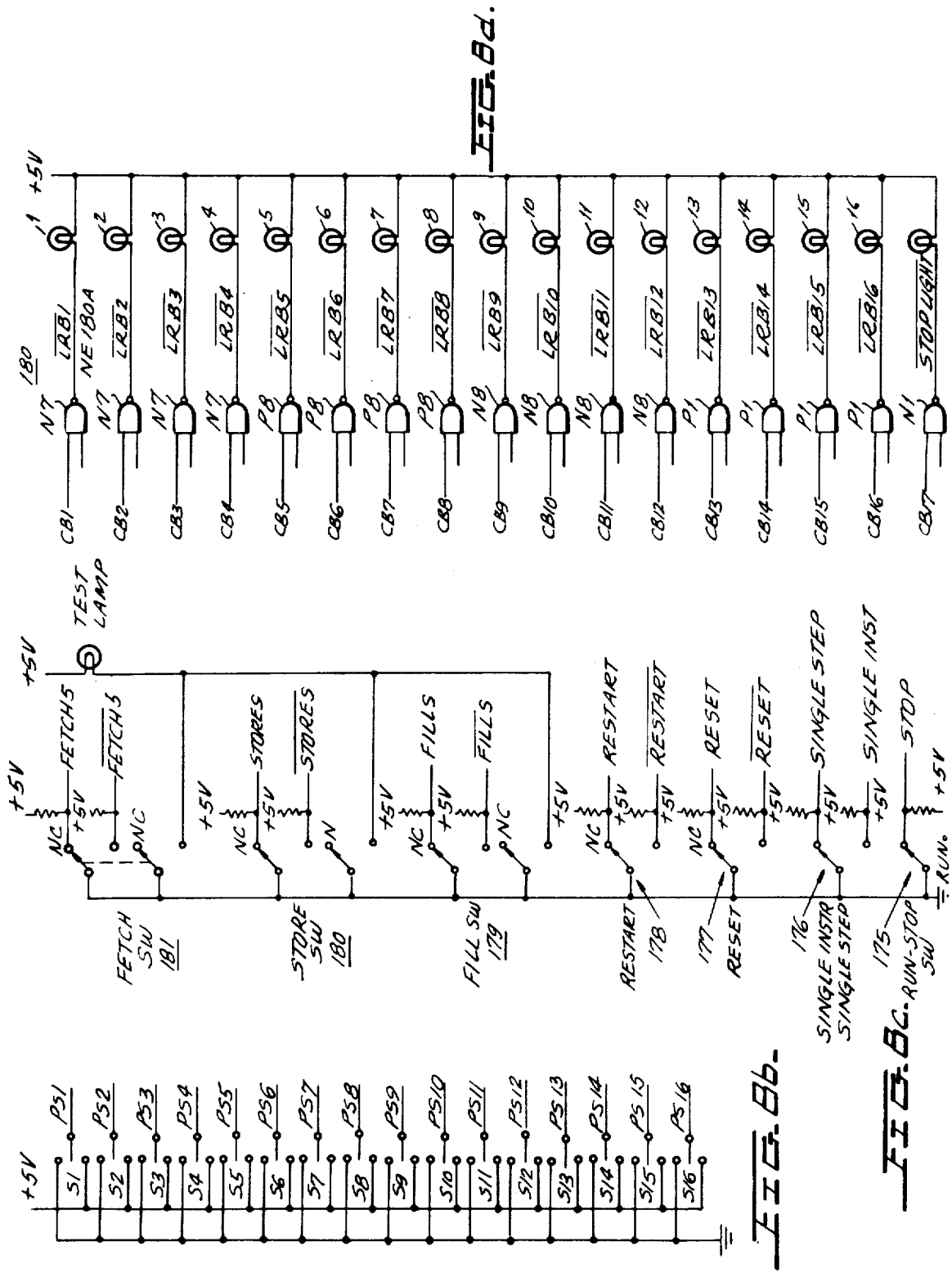

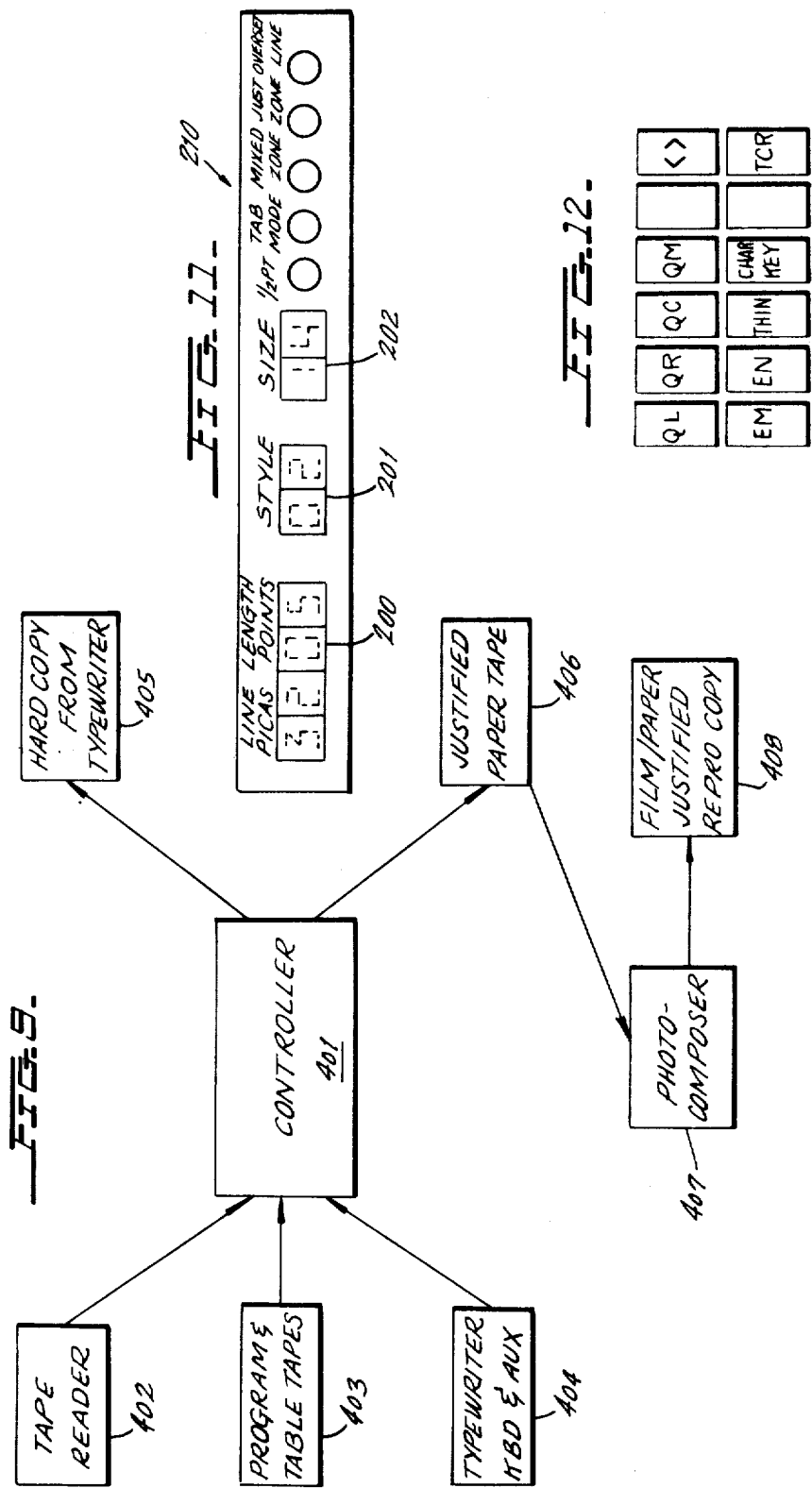

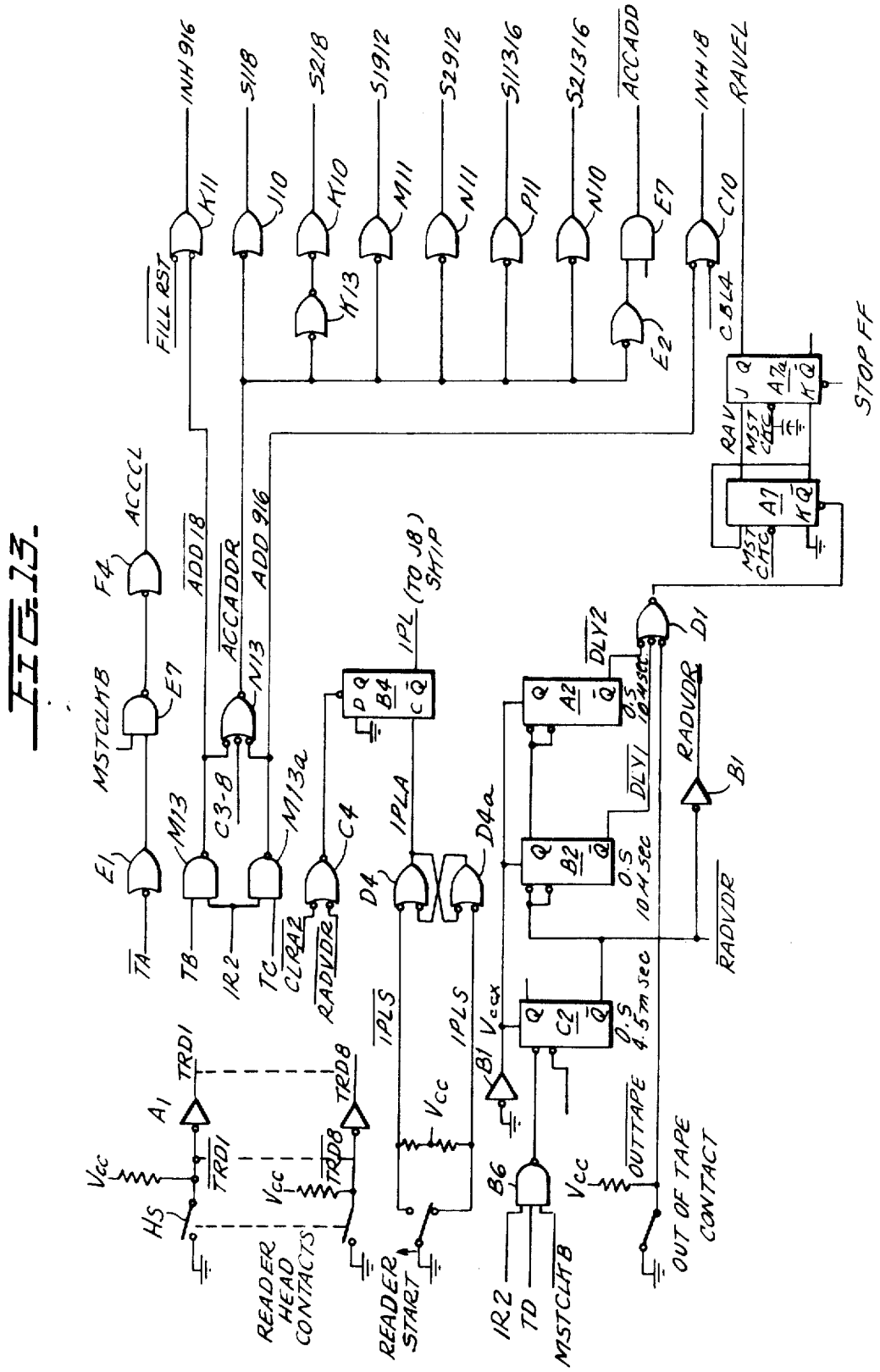

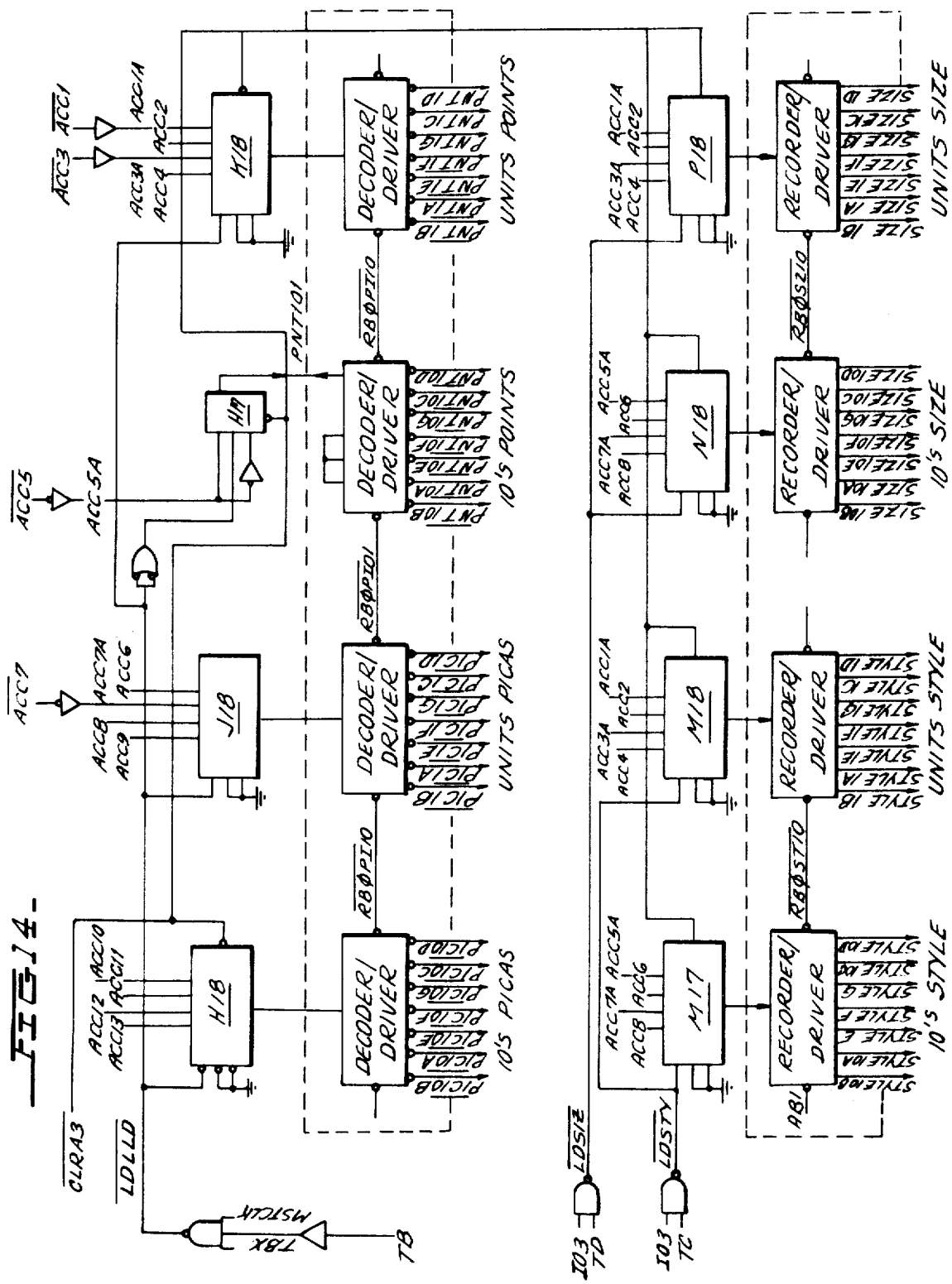

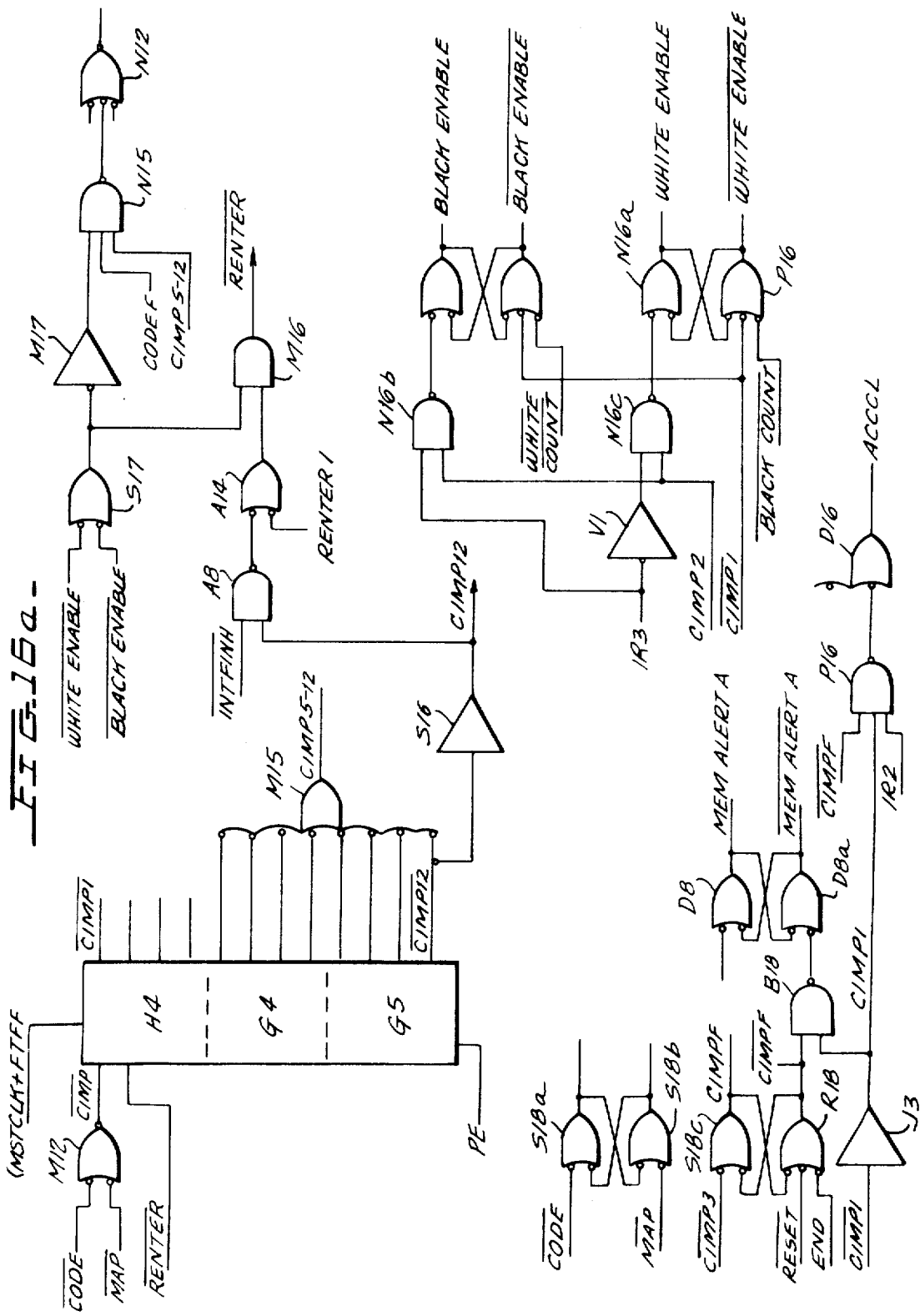

PROGRAMMABLE CONTROLLER

The present invention relates to controllers, and more particularly to a highly flexible stored program controller for use in performing a wide variety of functions for operating control devices, as a systems controller or as a "stand along" small-scale computer.

BACKGROUND OF THE INVENTION

There exist a wide variety of applications wherein high speed programmed control of a variety of peripheral devices is required. For example, large-scale computer systems are typically provided with peripheral devices which are operated by the computer in conventional techniques in order to perform data transfer between and among the peripherals and the computer. Such control constitutes uneconomical use of the computer, thereby inhibiting the computer from performance of its normal duties during those time periods in which such control activities must be exerted.

BRIEF DESCRIPTION OF THE INVENTION

The present invention is characterized by providing a highly flexible stored programmed controller apparatus capable of performing such control operations at operating speeds which are substantially equivalent to that of present-day large-scale computer systems.

FUNCTIONAL DESCRIPTION

The controller is a programmable, solid-state digital computer, designed primarily for input/output operations required in controlling electromechanical devices or communications devices. The system is a single-address, 16-bit computer using 2's complement arithmetic. The memory system is 16-bit word oriented; the memory banks each have a capacity of 4096 16-bit words. The use of two 4K ×8 memory units to construct each bank facilitates the retrieval or storage of either the most significant byte or the least significant byte, the other byte being left in memory unchanged. Each instruction occupies two bytes (one in the upper half of the memory bank, the other in the lower half); any 16-bit instruction or data word can be accessed by a 12-bit address that is supplied simultaneously to both memory units of both banks. The Address Reset signal sets the address into all four memory address registers and clears the data registers; however, Initiate Read and Initiate Write commands are supplied only to one bank at a time, under program control. Execution of instructions requires 2 microseconds for the Fetch sequence and between 1 and 16 microseconds for the Execute sequence; the average execution time for instructions other than Shift or Rotate is 5 microseconds. A single interrupt channel is provided and is shared by the paper tape punch and the Selectric and Auxiliary keyboards; when an interrupt request is granted, control is transferred to a predetermined memory location, where a servicing routine identifies the interrupting device and takes the required action.

Upon detecting a missing half-cycle of ac power, the controller initiates a shutdown and memory protection sequence, with automatic recovery when ac power is restored. The same protection circuits allow automatic initialization and entry into the program after normal turn-on.

The controller is comprised of a common bus which is the focal point for the transfer of all data within the controller including the receipt of data from an external source and the transmission of controller data to an external destination. The common bus is provided with a plurality of multiplexers which are designed to receive a multi-bit input code to either inhibit multiplexer action of to select those remaining components of the controller which are to receive data from or pass data to the common bus multiplexer.

The common bus channel selection signals mentioned hereinabove are derived, based on inputs from the controller instruction sequencer during portions of the individual instruction cycles. Alternatively, channel selection signals may be manually generated from front panel controls provided therefor.

The instruction sequencer controls all the aspects of signal flow within the controller based on the application of instruction select signals derived from an instruction decoder or through the use of manual controls provided therefor. The instruction sequencer consists of a plurality of shift register stages which are capable of accepting an instruction enable signal and for shifting the signal through a number of stages associated with the decoded instructions, whereby the shifting operations occur at a predetermined clock rate. Upon the decoding of an instruction, the sequencer provides one and only one discrete output for each clock phase of an individual instruction cycle, which instruction cycles may vary from one to a plurality of clock periods.

The instruction sequencer control is comprised of a plurality of logical gating circuits for generating either parallel entry signals or shift signals for entering or shifting decoded signals in the instruction sequencer. Inputs of the instruction sequencer control circuits include timing signals from the instruction sequencer as well as manual control signals, when desired.

A program counter is provided which consists of a plurality of binary counters capable of accepting a multi-bit word (parallel entry) from the common bus and of counting up to a maximum of a predetermined count upon the application of each program counter increment signal. Parallel entry is enabled by the application of a load signal from the program counter control, and clearing of the program counter can be performed by the application of a reset signal manually developed from the front panel control. The multi-bit output from the program counter may be coupled to the common bus multiplexer when required.

The program counter control is derived from the control signals from the instruction sequencer, from front panel switches or from external sources to enable the program counter to be incremented or loaded.

An instruction register provided in the controller is made of a plurality of binary counters similar to those employed in the program counter. The instruction register is employed to store instruction words supplied thereto from the controller memory through the common bus multiplexer. The instruction register has a capability of being incremented, of being loaded (in parallel entry form) in independent bytes of 8 bits each, and of being cleared by application of a reset signal manually controlled from the front panel. If desired, the incremental load signals can be applied from external sources due to the flexibility of design provided in the controller. The instruction register receives multi-bit words from the common bus in parallel bit serial byte form. The bytes entered into the instruction register may be coupled to other portions of the system through the common bus, and are also employed for control and instruction decoding purposes.

The instruction register control functions in a manner similar to the program control circuitry in that it enables the instruction register to be loaded and incremented at appropriate intervals.

The controller instruction decoder is comprised of decoding circuitry for converting binary coded decimal data into octal data for selecting the particular instruction sequence to be performed by the instruction sequencer.

The controller is further provided with an accumulator which is comprised of a multiplexer, storage register, full adder and control circuitry for operating each of the subunits making up the accumulator. Data may be transferred between the common bus multiplexer and accumulator in both directions. Control signals are applied from the sequencer, instruction register, and as well, from external sources. The accumulator full adder is capable of providing the parallel output to the accumulator multiplexer which is equal to the sum of the contents of a multi-digit word applied thereto from the common bus and the accumulator register. Provision is further made to insert a binary "1" in the first adder stage for 2's complement arithmetic or to add a binary "1" to the accumulator. The accumulator register consists of a plurality of bistable flip-flop circuits employed to store the outputs from the accumulator multiplexer. The control circuitry provides the means by which the bistable flip-flops are cleared and toggled, based on signals derived from the sequencer, manual signals from the front panel or external clear and load signals.

The accumulator multiplexer and control circuitry has a capability of transferring one of four inputs to the output of each of its stages based upon the state of a 2-bit code from the multiplexer control circuitry, and for applying the selected one of said four inputs to the accumulator register. The multiplexer control receives predetermined bits from the instruction provided in the instruction register, which bits select the direction of shift of the contents of the accumulator (right or left), how many shifts are to be performed and whether to rotate. Shift timing is supplied from the instruction sequencer to the multiplexer control circuits in the form of shift enable signals.

The memory control portion of the controller is comprised of a memory address register, a core memory, a memory data register, inhibit drivers and other control circuitry. The memory is of the "split" cycle-type in that separate commands are applied for read and write operations. During a read operation, the address of the desired word is applied from the common bus to the memory address register through the control circuitry. The memory address register is initially cleared, and the address is then set. A read control signal is generated and the selected word is read out of core memory and applied to the common bus through the memory data register and inhibit driver circuitry. The word is rewritten when a write control signal is applied together with the read-out word transferred to the core memory.

The controller is further provided with manual controls and indicators and may be operated through the use of the front panel controls.

Input-output interfacing is provided which is capable of interfacing the pluralities of sets of input lines with the common bus for connection to and from an external source.

The controller is capable of generating a plurality of basic timing sequences based upon its internal design as well as two manual instruction sequences and an automatic "fetch" cycle sequence.

The fetch cycle controls the flow of data from the core memory to the instruction register within a predetermined number of clock times, the memory is addressed and data is transferred and rewritten. The fetch cycle is initiated at the time of completion of each individual instruction or may be controlled from the front panel. The execution of any decoded instruction automatically initiates a set cycle which is comprised of six consecutive clock periods which are as follows:

1. The instruction sequencer enables the common bus multiplexer control to transfer the contents of the program counter to the memory address register through the common bus multiplexer;

2. During the next clock period, the contents of the selected memory location are transferred to predetermined stages of the instruction register and the program counter is incremented by one count;

3. The next clock period causes the data read-out of memory to be rewritten in memory in the same location;

4. The contents of the incremented program counter are again transferred to the memory address register (which is the address following the first address);

5. In the fifth clock period, the contents of the second memory location are transferred to the instruction register and the program counter is again incremented by one. This provides the next memory address (for use when the fetch cycle is completed if a jump, jump store, or skip instruction is not decoded);

6. During the sixth clock period, the word transferred to the instruction register is rewritten in memory, the instruction decoder is enabled and a single output signal from the decoder is parallel-loaded into the instruction sequencer. At this point, the decoded instruction is then executed and, upon completion, a new fetch cycle is automatically initiated.

The controller may be employed in a variety of applications. One exemplary system is that in which facsimile data is transmitted at significantly faster rates as compared with present-day techniques. An image is scanned line-by-line to generate discrete levels (white or black) at many discrete positions along each scanned line. The binary states of each position are transferred in 8-bit bytes in parallel to the controller. The accumulator counts successive zeros (or ones) to develop binary numbers having a reduced number digit positions and which are then transmitted. Each reversal from "black" to "white" (or "white" to "black") begins a new count. A similar controller at the receiver end receives the counts and converts each successive count into a string of binary zeros or ones to recreate the actual binary positions of the scanned lines. These operations are performed through the use of the CODE and MAP instructions respectively.

Another highly effective application is one in which the controller is employed in a photocomposer system in which lines of print are entered into the controller through a typewriter keyboard. A display keeps a running count of the number of picas and points and signals the operator when justification is no longer possible due to the loading of excessive characters into the typewriter printer. Data representing program and lookup tables for character widths and other photocomposing data is loaded into the controller by a paper tape reader.

The controller accepts raw data from the typewriter, a line at a time and performs all calculations necessary to justify the line and converts the data into a code compatible with the composing device being used. The lamp displays indicate to the operator the typesetting parameters in use, show when the line is justifiable by interword spacing or by both interword and intercharacter spacing and give warning of an overset line.

OBJECTS OF THE INVENTION

One object of the present invention is to provide a novel controller incorporating a common bus which is the focal point for all data transfer within the system and an instruction sequencer which greatly enhances system operation while significantly reducing the instructions required to program a software routine.

Another object of the present invention is to provide a photocomposer justifying system employing the novel controller described in the above object.

BRIEF DESCRIPTION OF THE FIGURES

The above as well as other objects of the invention will become apparent when reading the following description and drawings in which:

FIGS. 1 and 1a are block diagrams showing respectively a controller and a controller for a justifying application, each Figure being contained on two sheets.

FIG. 2 is a schematic diagram showing the common bus of FIG. 1 in greater detail.

FIG. 4 is a schematic showing the program register of FIG. 1 in greater detail.

FIG. 5 is a schematic showing the instruction register and decoder of FIG. 1 in greater detail.

FIGS. 6a, 6b and 6c are schematics showing accumulator of FIG. 1 in greater detail.

FIGS. 7 and 7b are diagrams showing the memory and interface logic of FIG. 1 in greater detail.

FIG. 7a shows a plurality of waveforms useful in explaining the memory operation.

FIGS. 8a–8d show the front panel controls of the controller of FIG. 1.

FIG. 9 shows the photocomposer justifier structure employing a controller of the type shown in FIG. 1.

FIG. 11 shows the copyboard panel face of the justifier of FIG. 9.

FIG. 12 shows the auxiliary keyboard employed in the system of FIG. 9.

FIG. 13 is a schematic diagram useful in explaining the operation of the tape reader.

FIG. 14 is a schematic diagram showing the copyboard display logic for the display of FIG. 11..

FIGS. 16a and 16b are schematic diagrams useful in describing CODE and MAP operations.

Figure 3:
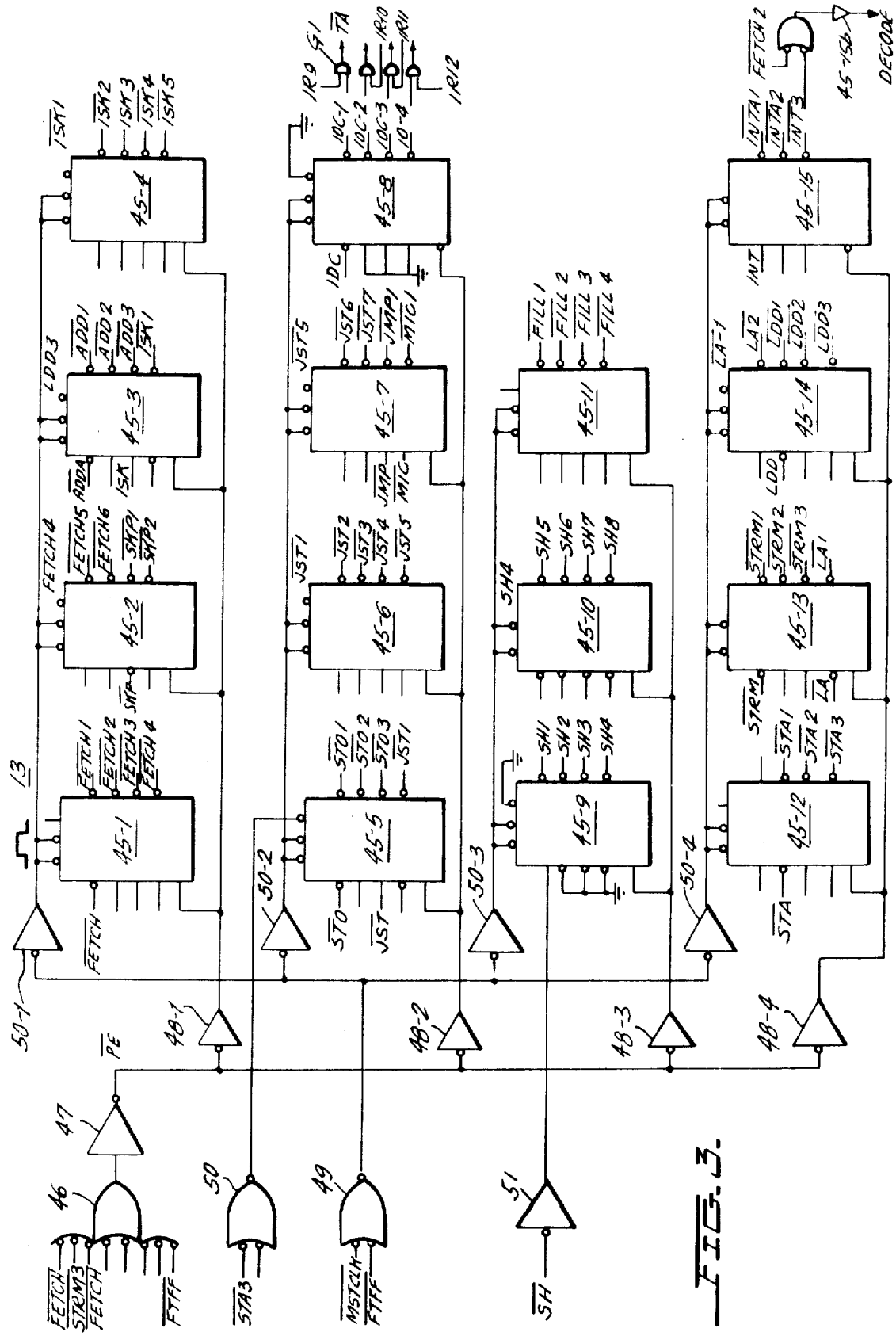
FIGS. 3 and 3a are schematic diagrams showing the instruction sequencer and timing control circuits of FIG. 1 in greater detail.

The controller, when employed in a line adjusting system for setting type, is designed to perform text editing functions for a photocomposing machine. The program and its lookup tables are stored into memory via the paper tape reader. Raw text is then entered via a typewritten keyboard and an auxiliary keyboard allows entry of typesetting parameters such as line length, type style, and type size, as well as control commands for insertion of fixed-width spaces and for margin alignment. A lamp display on the copyboard above the typewriter keeps the operator informed of the amount of space left in the line, and indicates when justification of the line is possible. When the operator terminates the line with a Carriage Return character, the controller performs justification calculations and outputs paper tape containing the characters and the justification data in a form compatible with the composing machine in use. The paper tape is removed and is used as the input to the photocomposing machine. However, the versatility of the controller is such that the keyboard can be adapted to almost any task that requires the translation of one paper tape code to another or the outputing of paper tape from keyboarded data.

DETAILED DESCRIPTION OF THE FIGURES-SYSTEM DIAGRAM

FIG. 1 shows a block diagram of the controller 10 of the present invention which is operated by means of front panel controls provided at an external location and based upon the use of optional external control functions. The ensuing description describes controller 10 as operated from the front panel as well as indicating external control provisions, where available.

COMMON BUS

The focal point for the transfer of all data within the controller is the common bus 11 which also includes the handling of data received from an external source and to be transferred to an external destination from the controller. All major registers, as well as the two memory banks, have their input lines permanently tied to the common bus lines. Common bus 11 is comprised of 16 multiplexer stages which are employed to transfer one of eight inputs to the output in both true and complement forms. Five of the eight common bus channels in the first eight stages are utilized for internal controller signal flow while three channels in these stages are available for system design purposes. The ninth through twelfth stages contain six channels utilized for internal signal flow while the thirteenth through sixteenth stages contain three channels for internal use while one is made available for system design. It should be noted that additional common bus channels can be added as desired by inserting additional logic elements.

Common bus channels are selected by a three bit input code applied to those stages having eight inputs and by a 2-bit input code to those stages having four inputs. An inhibit input is also available which is employed to inhibit multiplexer action in the first 12 stages for certain machine operations. The multiplexer inputs of the first 12 stages are coupled to associated outputs of the program counter, the instruction register, the accumulator (first 12 stages), the panel switches 1–12 and the first eight of the first 12 stages are coupled to the nine output lines of the memory. The eight output lines of the memory are also coupled to associated inputs of the respective 9–12 stages of the common bus. The output of the common bus stages are coupled to the program counter (the first 12 stages), the instruction register, the full adder, the manual indicators and the input/output lines.

COMMON BUS MULTIPLEXER CONTROL

The common bus multiplexer control 12 develops common bus channel selection signals based on inputs from the instruction sequencer 13 (to be more fully described) during portions of individual instruction cycles. Channels may be selected manually from the front panel controls as indicated by connection 14a of the manual control and indicator block 14.

The common bus multiplexer control determines the data to be transferred and the time of transfer of the data to the common bus and is comprised of a plurality of multiple OR gates which selectively enable one of the input lines of each of the multiplexers to enable the data applied to that input line and only that input line to be transferred to the common bus.

INSTRUCTION SEQUENCER

The instruction sequencer 13 controls all aspects of signal flow in the machine based upon the application of instruction select signals from the instruction decoder 16 (to be more fully described) or the manual controls 14. The instruction sequencer is comprised of 56 four-stage registers coupled in a predetermined fashion so as to provide one instruction enable signal at a time and then to shift the signal through the number of shift stages associated with the decoded instruction. Since some instructions require as little as one clock time and others as many as 8 clock times, the shift registers are coupled so as to provide the appropriate number of clock time signals. For example, the add instruction requires three clock times and hence a single four-stage shift register is sufficient to provide the three clocking signals required for an add instruction.

The instruction sequencer control 15 consists of logical gates which generate either parallel entry signals or shift signals employed by the instruction sequencer. The inputs to the instruction sequencer control circuits include timing signals from the instruction sequencer itself (for example, "time to bring up the next instruction") and manual control signals.

PROGRAM COUNTER

The program counter 17 is comprised of a 12-stage binary counter capable of accepting any 12-bit word (parallel entry) from the common bus and is capable of counting from 0 to 4096 sequentially upon the application of program control increment signals from the program counter control 18. Parallel entry is enabled by application of a load signal from the program control counter and the program counter can be cleared by application of a recess signal from the front panel controls 14. The 12-bit output from the program counter is available for transfer to common bus 11.

The program counter control 18 receives control signals from the sequencer, from the front panel switches and from external sources. In addition, the counter receives a special increment input from the instruction register 19. The program counter control is comprised of logical gating circuitry for loading and incrementing the program counter under control of the front control panel, the instruction sequencer, the instruction register, and is further provided with external program control capability.

INSTRUCTION REGISTER

Instruction register 19 is comprised of a 16 stage binary counter similar to that used in the program counter. The instruction register is used to store instruction words for memory while operations are performed upon them. The register can be incremented, loaded in parallel in independent bytes of 8 bits each and can be cleared by application of a reset signal from the front panel controls. Increment and load signals can be applied from external sources at the discretion of the user.

The instruction register receives 16 bit words from common bus 11 in 8-bit bytes ( one byte at a time). The 8 most significant bits are typically loaded into the instruction register first and the 8 least significant bits then follow. The output bits of the first 12 stages of the instruction register are connected to the common bus and are used elsewhere in the equipment as control signals. Bits in the 13th–16th stages are applied to the instruction decoder and control circuitry 16.

INSTRUCTION REGISTER CONTROL

The instruction register control circuit 20 functions in a manner similar to the program counter control circuit 18 which, under the control of the construction sequencer 13 or front panel 14 or through an external connection, the instruction register control loads and increments the instruction register.

INSTRUCTION DECODER CONTROL

The instruction decoder circuit 21 comprises coding means for converting the code in the 14th–16th stages of the counter of instruction register 19 into octal form so as to provide one active output out of a possible 8 outputs in response to a three bit input code. Two such circuits are provided in the decoder, only one of which is enabled depending upon the state of the 13th stage of the counter of instruction register 19 which state is sensed by the instruction decoder circuit 16 and provides a decode enable signal to instruction decoder 21 upon the presence of a decode signal from the construction sequencer 13.

ACCUMULATOR

The accumulator 22 is, in turn, comprised of a multiplexer 23, storage register 24, full adder 25, and control circuits 23a–25a, respectively, provided for controlling the multiplexer 23, accumulator register 24, full adder 25. Data is transferrable between common bus 11 and the accumulator while control signals are derived from the instruction sequencer 13, the instruction register 19 and as well from external sources.

Turning to a consideration of the components of the accumulator:

FULL ADDER

The accumulator full adder 25 is a 16 stage adder having carry input and carry output capability. The full adder continually tracks the common bus 11 and the accumulator register 24 to generate the sum of these two sets of inputs ($\Sigma 1 - \Sigma 16$). The outputs of each of the stages of the full adder are applied directly to one input in the channel of the accumulator multiplexer 23. Provision is provided within the full adder to apply a binary "1" to the carry input of the first stage in order to perform 2's complement arithmetic. This occurs during selected program steps under control of a shift instruction from the instruction sequencer 12 and when a binary "1" is present in the 9th stage of instruction register 19, which conditions are applied to full adder control 25a to enable these operations.

The accumulator register is comprised of 16 bistable flip-flops employed to store the contents of the accumulator. Inputs are derived from the accumulator multiplexer 23 and both the true and complement values thereof are provided at the output of each stage of the accumulator register. The control means 24 serves to either clear the accumulator register either from the panel controls from an external source or from the instruction sequencer. Alternatively, these three input sources to accumulator register control 24a may control a toggle operation which causes the accumulator register to store the output of the multiplexer present at its input. The binary input shifted into the accumulator register remains until the occurrence of the next toggle operation when the outputs thereof change if the multiplexer input values have changed.

MULTIPLEXER

The multiplexer 23 is comprised of 16 multiplexer stages each of which has four data inputs and two control inputs. The control inputs accept a two-bit code from the multiplexer control circuit 23a which, depending upon their particular state (it being understood that there are four possible combinations) transfers one of the four data inputs to the output of each stage, which inputs are derived from the full adder and the accumulator (three of the four inputs to each multiplexer stage are derived from outputs of three selected stages of the accumulator). The multiplexer control circuit 23a is comprised of logical gating circuitry which, in turn, is controlled by the first twelve counter stages of the instruction register 19 to select the direction of shift of the contents of the accumulator (right or left), the number of shift operations to be performed (from 1 to 8) and whether the contents are to be rotated (right or left). The timing of each shift operation is controlled by the instruction sequencer 13 in the form of shift enable signals.

MEMORY

The controller is further comprised of a memory 26 and a memory control circuit 26a therefor. The memory is comprised of a memory address register 27, a 1024 (or 4096) 8-bit word core 28 and a memory data register 29 which includes inhibit drivers and other control circuitry. The memory is of the "split" cycle type in that separate commands are applied for read and write operations. Although a core memory is described as being employed in the preferred embodiment, it should be understood that other equivalent types of memories may be utilized.

During a read operation the address of the desired word is applied from the common bus 11 to the memory address register 27 through appropriate logic circuits provided within memory control 26a. The memory address register is initially cleared by a signal from the memory control circuit 26a and the address is then set by a second control. A read control signal is applied and the selected word is applied to the common bus having been selected from core memory 28 and transferred from core through the memory data register circuit 29. The word is rewritten when a write control signal is applied together with the application of the last 8 stages of the common bus to the memory inhibit drivers. In actuality, the word read out from core is comprised of 8 bits and is simultaneously read into both the first and second 8 stages of the common bus. The second 8 stages of the common bus are thus employed to rewrite the word read out of memory during the write control phase.

INPUT-OUTPUT

The memory control circuits contain all the gates that allow read and write operations to be initiated at appropriate times during the fetching, rewriting, and execution of an instruction. All memory operations consist of both a read and a write operation at the same location, though the write requires a separate initiating signal and may be delayed for one or more clock times after the read. All read operations, whether for instructions of for data, generate an ADDRS pulse that clears the data and address registers in all four memory units and resets the address registers to the address presented on bits 1–12 of the common bus. This address is normally taken either from the program counter or from the instruction register. An initiate read (INTRD1 or INTRD2) pulse is then routed to the bank selected by the PR or MR flag, and the content of the specified address is read in both halves of the bank and is stored in the memory data registers. The content of the lower memory unit appears on memory output lines DB01 through DB08 which are connected to the multiplexers for common bus lines CB1–CB8. The content of the upper memory unit appears on memory output lines DB09–DB016, which are routed to the multiplexers for common bus lines CB1–CB8 as well as those for CB9–CB16; thus the upper half of a data word can be transferred either to the upper half or the lower half of the common bus. An initiate write (INTWRT1 or INTWRT2) pulse causes the word presented on the common bus to be rewritten into core via the memory input lines DBI1 –DBI16 which are permanently tied to common bus lines CB1–CB16. The INTWRT pulse is supplied only to the bank specified by the PR or MR flag. Thus the connection of the memory output lines (DBO) to the memory input lines (DBI) via the common bus allows data to be rewritten unchanged; alternatively, new or modified data may be written in place of what was read.

ADDRESS REGISTERS

The 12-bit address registers of each unit all receive the same address, though only one bank at a time is read or written. Thus the address allows access to any one of 4096 memory locations in the selected bank, each location being effectively 16 bits wide.

DATA REGISTERS

The data register in each memory unit provides temporary storage for data read from the location specified by the address register. The data register outputs idle at logic 1; when a read is performed, core bits containing a logic zero drive the corresponding register outputs to zero. This allows the wired-OR connection of both banks to the DB0 memory output lines.

IOC CONTROL

The IOC control group contains the logic for initiating input/output operations. Whenever an input or output operation is performed under program control, the appropriate input/output command (IOC) generates a control signal and any or all of four sequential timing pulses lasting one clock time each. If the IOC has bit IR1 set, the paper tape reader is addressed; if bit IR2 is set, the paper tape punch is addressed. The addressing of copyboard lamp displays, the typewriter keyboard, and printer, is performed by nine decodes of IR3-IR6. The IOC control group contains the logic for generating the I/O address signal and the four timing pulses; the logic for detecting these and utilizing them is contained in the device interface logic.

The input output block 30 provides inner face for three sets of input lines (of 8 bits each, plus control lines) with the common bus 11 from an external source. 16 common bus lines are available for connection to an external location. Input terminals for two external interrupt lines are available and four programmable timing pulses are available as outputs from the controller.

INTERRUPT LOGIC

Provision is made for the punch and the keyboard to generate an interrupt request when ready for a data transfer. The hardware does not distinguish between the devices; instead, when an interrupt request is detected the machine completes the current instruction and then transfers control to a servicing routine that starts at location 002. This servicing routine tests the various device flags to identify the interrupting device and then performs the appropriate data transfers. Interrupt requests are denied under the following conditions:

1. If an interrupt servicing routine is already in progress. Upon completion of the service routine the return instruction and at least one instruction of the main program are executed, after which the pending interrupt request is serviced.

2. If a change of program reference bank in memory is pending. The change is ordered by a MIC instruction, but does not take place until execution of the next JMP or JST instruction. All interrupt requests are denied from the time the MIC instruction is executed until after the JMP or JST has been executed; then interrupt requests are serviced in the order determined by the servicing routine.

READER CONTROL

The paper tape reader may operate under program control, or in the Fill mode that is used for loading programs or data into memory prior to running a program. In the programmed mode, four IOC's and a Skip instruction are available. Two IOC's clear the accumulator, read a character from tape, load the character into the upper or lower half of the accumulator, and advance the reader. The other two IOC's do not clear the accumulator, so that the character is added to the current content of the selected half of the accumulator. The Skip instruction tests the status of the Reader Available flag. In the Fill mode, the machine reads two characters and stores them (via the accumulator) at the current program count, then increments the PC and reads and stores two further characters. This process continues until the program count reaches a terminating address preset on the controller switch panel.

PUNCH CONTROL

The paper tape punch may operate under program control or in the Dump mode. In the programmed mode, four IOC's and a Skip instruction are available; there is also a punch interrupt which may be enabled, cleared after an interrupt request, or disabled by MIC instructions. Two of the IOC's transfer either the upper or the lower half of the accumulator to the punch register and initiate a punching cycle for one character; the other two IOC's operate in exactly the same manner but in addition command the accumulator bits to be punched in reverse order. Upon completion of the punch cycle the punch control raises the Punch Ready flag, which may be tested by the Skip instruction; in addition, if the punch interrupt is enabled, the punch interrupt request is generated.

COPYBOARD LAMP DISPLAY CONTROL

For photocomposition purposes various composition parameters are displayed by indicators placed along the bottom of the copy-holding board. A group of four 7-segment indicators indicates the current deficit in picas (tens and units) and points (tens and units) and is updated by the program each time a character is entered from the Selectric keyboard. Two similar units display a 2-digit number that identifies the type style in use, and two further units show the selected type size in points (tens and units). Other single lamps show that a half-point is to be added to the indicated type size, that tabulation is in progress, that interword justification or mixed justification can be performed, or that the line has been overset. The single lamps are lit or extinguished under program control by IOC's; the 7-segment indicators are driven by lamp registers through BCD-to-7-segment decoders. The lamp registers are loaded from the accumulator by appropriate IOC's.

TYPEWRITER CONTROLLER

The typewriter of the photocomposition system has a keyboard and printer which are mechanically independent but are linked electrically through the typewriter controller. The keyboard and printer constitute two separate devices from the point of view of the controller. The character keys of the keyboard generate a 7-bit code that is loaded into a keyboard buffer and generates an interrupt request; the code is also routed to the printer solenoids and causes the printer to print the character associated with the key. The function keys of the Selectric (such as Shift, Unshift, Backspace, etc.) generate a single command signal that is routed to the corresponding solenoid but is also converted to 7-bit code by the typewriter controller. The same remarks also apply to the keys of the Auxiliary Keyboard. Output characters from the controller are loaded into a 7-bit printer buffer and thence to the printer solenoids. Whenever the printer buffer is loaded, a Printer Busy flag is raised, and is not lowered until a return signal from the printer indicates that the solenoids have been picked and the print cycle is under way. Other flags indicate red or black ribbon status, upper or lower case status, keyboard locked or unlocked, and keyboard busy. All these flags can be tested by appropriate Skip instructions.

DATA PROCESSING STRUCTURE

Figure 10:
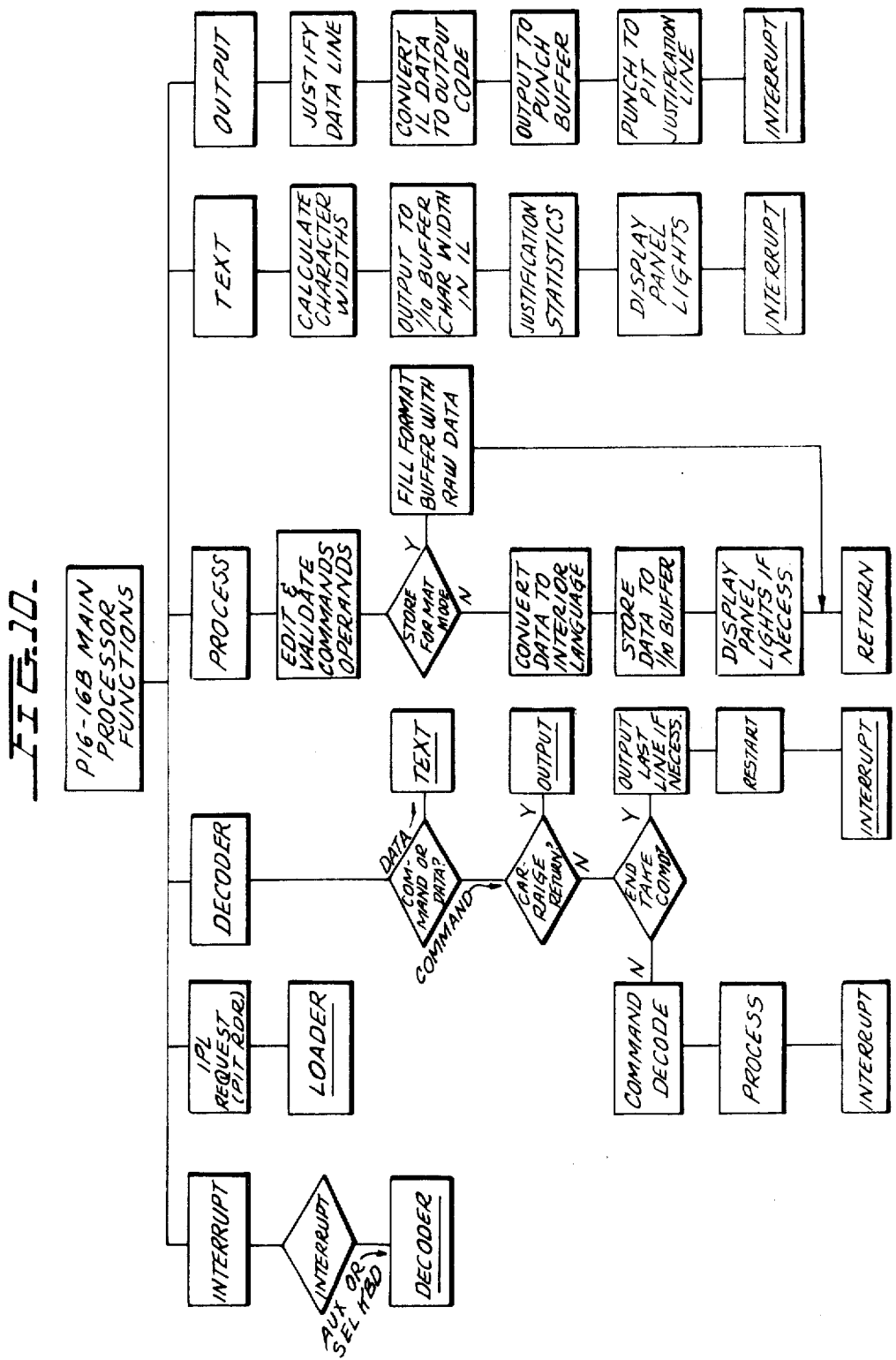
FIG. 10 is a flow diagram showing the processing functions performed by the justifier of FIG. 9.

FIG. 9 shows the main processing structure of the type comprising system and FIG. 10 shows details of the main processing functions. It should be noted, however, that this particular configuration is only one among many possible configurations. Because of the flexibility of the controller and the modular nature of the software, the keyboard can handle any input or output code using up to 8 bits.

INPUTS

The program and lookup tables for character widths and other photocomposing data are loaded via paper tape. Initial program loading into a blank core is performed in the Fill mode; however, the program includes a bootstrap loader routine for loading format tapes, and once this routine is resident in core the operator can load format tapes under program control without going to the Fill mode. Data input may be in the form of raw or justifiable tape punched on tape in TTS code and entered via the paper tape reader, or may be manually entered as raw data via the Selectric keyboard and the auxiliary command keyboard.

PROCESSING

The type composing system accepts justifiable text input from the paper tape reader or raw text from the typewriter keyboard, one line at a time, performs all calculations necessary to justify the line, and converts the interior machine language character code into a code that is compatible with the composing device in use. Keyboarded characters appear on the Selectric printer as they are entered, in black for text and in red for control data. The justified line is outputted to a paper tape punch and contains complete character identification and space width data to enable the photocomposing machine to produce justified text. Lamp displays indicate to the operator the typesetting parameters in use, show when the line is justifiable by interword spacing or by both interword and intercharacter spacing, and give warning of an overset line.

OUTPUTS

Hard copy, containing all text and control characters keyboarded by the operator, is produced by the Selectric printer. When justification calculations have been performed for a line of text, the line is punched on paper tape (including all control data required by the photocomposer).

DETAILED BLOCK DIAGRAMS OF SYSTEM COMPONENTS

The following description taken in conjunction with the drawing, shows the various components referred to hereinabove in greater detail.

COMMON BUS SWITCHING

All data transfers within the controller and between memory and machine registers are carried out via a common bus that is 16 bits wide. Memory input lines and register input lines are permanently tied to the common bus and loading is performed by supplying the destination register with a strobe pulse at the appropriate time. Each common bus line obtains its source data from an 8-input multiplexer to which memory and register output lines are connected. The selection mechanism is illustrated in FIG. 2.

The sixteen common bus lines are divided into three groups consisting, respectively, of bits 1-8, bits 9-12, and bits 13-16. FIG. 2 shows the data sources and address lines connected to the first bit in each group as being typical of the other bits in the same group. In addition to the 8 data inputs, each multiplexer has three address lines an an inhibit line. If the inhibit line is driven high, the multiplexer is disabled with the CB output low and the CB output high. If the inhibit line is held low, and a binary address (S2 most significant bit, S0 least significant bit) is presented on the address lines, the CB line follows data presented on the input line that has the same number as the address. Thus, with address 000, input 0 is enabled and switches the PC outputs onto CB1–CB12 and ground onto CB13–CB16; with address 111, input 7 is enabled and ACC1–ACC16 are gated onto CB1–CB16. The address lines are designated by their S number, followed by the first and last bit numbers in the controlled group; e.g. S218 is the S2 (most significant) address line for the multiplexer group controlling bits CB1-CB8, and S11316 is the S1 line for the group controlling bits CB13–CB16. Likewise, INH18 inhibits bits CB1–CB8, and INH916 inhibits bits CB9–CB16.

COMMON BUS

FIG. 2 shows the common bus 11 which is comprised of 12 8-bit multiplexers 31-1 — 31-12, and 4 4-bit multiplexers 32-1 — 32-4, of which selected ones of said multiplexers have been omitted for purposes of simplicity. Multiplexers 31-1 — 31-12 are utilized to transfer one of 8 inputs to the output of each multiplexer in both true and complement form. Five input channels are utilized for internal signal flow while three input channels are available for other system applications.

Channel selection is based upon a three bit input code from the common bus control circuit. The control inputs are designated S0, S1 and S2. Pin 1 of each of the multiplexers 31-1 — 31-12 is connected to an associated output terminal of the program counter (PC-1 — PC-12). In a like manner, the input pins 2-5 are respectively connected to associated output terminals of the instruction register, accumulator panel switches and memory output lines (the memory output lines are connected to pin 5 multiplexers 31-1 — 31-8 and are again connected to pin 5 of the multiplexers 31-9 — 31-12 and 32-1 — 32-4, respectively).

The four-input multiplexers 32-1 — 32-4 are employed to select three channels and signal ground.

Multiplexers operate to select only one of their input terminals and couple the state of the selected input terminal to the output terminals (pins 15 and 14) which respectively represent the true and complement form of the state of the selected input pin. Multiplexing control is exerted by the lines S0, S1 and S2 which are connected to pins 11, 12 and 13 respectively, of multiplexers 31-1 — 31-12. An inhibit line is also provided and is coupled to inhibit pin 10 of each of the multiplexers 31-1 — 31-12. As can clearly can seen, a binary code of three binary bits provides 8 possible combinations thereby enabling each of the 8-bit multiplexers to couple one of their 8 inputs (pins 1-8) to their associated true and complement form output pins 15 and 14. It can thus be seen that the common bus is capable of transferring the output of the program counter, instruction register, accumulator, panel switches or memory output lines to the output terminals of the multiplexers on a one-at-a-time basis exclusive of the simultaneous presence of data at two or more of the 8 inputs of the multiplexers 31-1 — 31-12 or of the 3 inputs of the 4-bit multiplexers 32-1 — 32-4.

COMMON BUS MULTIPLEXER CONTROL

The data to be transferred and the time of transfer to the common bus are controlled by the multi-input OR gates which are shown in FIG. 2. For the most part, the input to the OR gates originate in the sequence or during portions of individual instruction cycles. For example, with reference to OR gate 33, one of the inputs is $\overline{JST7}$ applied to one input pin thereof. When this signal arrives and is LOW (i.e. zero volts DC), a high level condition (+5 volts DC) appears at the output of OR gate 33. At this time no active inputs are applied to gates 34 and 35 so that their outputs develop low levels. The channel selection code thus applied to multiplexers 31-1 — 31-8 is s2=L, s1=L, and s0=J. This enables the input on pin 2 of each of the multiplexers 31-1 — 31-8 enabling the contents of stages 1-8 of the instruction register to be placed on the common bus which occurs during a predetermined clock time during the JST (jump store) instruction. Gates 39-43 operate in a similar manner for the control of multiplexers 31-9 — 31-12 and 32-1 — 32-4. The inhibit gates 36 and 38 inhibit the operation of the multiplexers during certain phases of instruction routines.

The instruction sequencer 13 is shown in FIG. 3 and is comprised of 14 shift registers 45-1 through 45-14 with each individual register containing four shift register stages employed to control logic operations during one clock time of a specific instruction. In operation only one input is enabled at any given time. The Fetch sequence reads an instruction from memory at the location specified by the program counter, transfers the op code portion of the instruction to a decoder and the address portion to the instruction register via the common bus, and enters the instruction decode into the appropriate portion of the sequencer. Normally the last step of any instruction enters the $\overline{FETCH}$ decode into the sequencer and the next two clock pulses perform the two steps of the Fetch sequence. However, under certain conditions the normal fetch sequence is inhibited or modified. The sequencer is enabled initially by the application of a FETCH signal applied to one input of OR gate 46 and simultaneously applied to pin 2 of shift register 45-1. The output of OR gate 46 goes high which is inverted by inverter 47 to produce a low level signal simultaneously applied to inverters 48-1 through 48-4. The high input developed by inverters 48-1 through 48-4 is thereby simultaneously applied to pin 6 of all of the shift registers 45-1 through 45-14. This enables the transfer of any signal appearing on pins 2, 3, 4 or 5 to pins 13, 12, 11 or 10, respectively. Since the $\overline{FETCH}$ cycle has been initiated, the $\overline{FETCH}$ signal is present at pin 2 of register 45-1. The term $\overline{FETCH-1}$ (low level) is outputted from pin 13 of register 45-1. At this time no other active signals are produced by the sequencer.

During the next portion of the $\overline{FETCH}$ cycle, a Low going clock signal from gate 49 is simultaneously applied to inverters 50-1 through 50-4. Each of these inverters applies a high going pulse to pins 8 and 9 of each of the registers 45-1 through 45-14. On the trailing edge (low going portion) of this pulse the LOW on pin 13 of register 45-1 is shifted to pin 12 developing $\overline{FETCH}$ 2, and a high level is shifted into pin 13 from pin 1. It should be noted that no connection to any input pin is the same as applying a high level to that pin.

The next clock pulse from OR gate 49 shifts the LOW to pin 11 ($\overline{FETCH}$ 3) and successive clock pulses shift the low to pin 10 ($\overline{FETCH}$ 4) and thereafter to pin 13 of register 45-2 ($\overline{FETCH}$ 5). It should be noted that pin 10 of register 45-1 is connected to pin 1 of register 45-2 enabling the $\overline{FETCH}$ cycle to continue through 6 clock times as is required by the $\overline{FETCH}$ cycle. Hence the necessity for coupling the first two stages of register 45-2 to the last or fourth stage of register 45-1.

When the term $\overline{FETCH}$ 6 is present, the instruction register contains a sixteen bit word from memory. The upper four bits define the instruction to be performed. The instruction is decoded, producing one parallel input to the sequencer (which includes any of the instructions of the repertoire). It should be noted that the $\overline{FETCH}$ 6 output is coupled to one input of OR gate 46 automatically placing the sequencer into the next instruction cycle. At this time, the decoded instruction, for example $\overline{STO}$ (store instruction) is applied to pin 2 of register 45-5. Subsequent clock pulses step the $\overline{STO}$ instruction through $\overline{STO1}$, $\overline{STO2}$, and $\overline{STO3}$. When STO3 has been completed, the STO (store accumulator) instruction has been executed. The last thing which occurs is the enablement of the next $\overline{\text{FETCH}}$ cycle by way of gates 53, 54, 55 and 56 which are shown in FIG. 3, so as to automatically institute another $\overline{\text{FETCH}}$ cycle. As can clearly be seen from a consideration of FIG. 3, the last instruction signal of each of the instruction routines is coupled tone input of either OR gate 53 or OR gate 57 so as to automatically institute a $\overline{\text{FETCH}}$ instruction each time an instruction routine is completed.

All instructions are sequenced in the same fashion as described hereinabove wherein the main difference is signal polarities. For example, it should be noted that the shift instruction (SH) is shifted through 8 clock times as 8 HIGH levels. In this case, the parallel entry (pin 2 of register 45-9) is high in its active state due to inverter 51, with the result a high level is shifted through all output pins of registers 45-9 and 45-10. Pin 1 of register 45-9 provides successive low input as the single high is shifted 8 times. The other special case involves a direct entry of $\overline{\text{STA3}}$ through OR gate 50 to pin 1 of register 45-5. On the third clock time of the STA (store adder) instruction, a LOW is applied to register 45-5 which initiates the STO instruction. Thus, the instruction sequencer, beginning with a hard wired $\overline{\text{FETCH}}$ instruction, automatically provides the instruction cycle requested and the appropriate number of cycle pulses within an instruction, at the end of which a $\overline{\text{FETCH}}$ instruction is again initiated.

PROGRAM COUNTER AND CONTROL

The program counter 17 is shown in FIG. 4 and is comprised of three 4 stage counters 83-1 through 83-3. The stages are interconnected to one another to develop any count from 0-4096 or alternatively to accept parallel entry of bit word from common bus 11.

Parallel entry is controlled by inputs to gates 84 and 85. OR gate 84 is enabled by application of a low level signal to any one of its inputs. To produce a high going level which is applied to AND gate 85 when its remaining input (MSTCLKA) goes high, a low going pulse ($\overline{\text{PCLD}}$) is simultaneously applied to pin 1 of each of the counters 83-1 through 83-3. While the pulse is low the states of inputs CB1-CB12 (the 12 output terminals of the common bus 11) are transferred to the respective outputs PC1-PC12. On the trailing edge of this pulse, the CB inputs are locked into the program counter.

Increment control of the program counter is provided for by the application of low levels to pin 8 of counter 83-1 through AND gate 86 which produces a high going pulse (PCINC) which occurs in coincidence with an MSTCLKA (high master clock signal and the output of OR gate 87 which is also high at this time so as to increment the program counter on the trailing edge. Four inputs to OR gate 87 results in incrementing of the program counter, which inputs include $\overline{\text{PCINC1}}$, $\overline{\text{FETCH2}}$, $\overline{\text{FETCH5}}$ and the output of AND gate 88 which is enabled when flip-flop 89 is set and either the term $\overline{\text{ISK4}}$ or $\overline{\text{ISK5}}$ is present at one of the inputs of OR gate 90. It can be seen that the pins 12 of counters 83-1 and 83-2 are respectively connected to the pins 8 of counters 83-2 and 83-3 so as to develop a 12-bit or maximum count of 4096.

Flip-flop 89 is cleared during JST1 (jump store) or ISK2 (increment skip) through OR gate 91. Flip-flop 89 is set when the 8th bit position of the instruction register (IR8) goes from high to low. Program counter is incremented when either $\overline{\text{ISK4}}$ or $\overline{\text{ISK5}}$ is low.

The logic associated with the $\overline{\text{PCINC1}}$ signal which is inputted to OR gate 87 is active during the SKP (Skip) instruction and operates to determine whether a series of conditions have been satisfied before the program counter may be incremented. Gates 92-1 through 92-7 are exclusive OR gates which function to generate a high level at their outputs only when one of their inputs is low and the remaining one is high. All inputs to AND gate 93 must be high in order to produce $\overline{\text{PCINC1}}$ and thereby increment the program counter.

One of the AND gates 94-1 through 94-6 must be enabled to produce signal $\overline{\text{PCINC1}}$. Each of these AND gates is coupled in a wired OR configuration and are applied through OR gate 95 and inverter 96 to the remaining input of AND gate 93. Thus all of the conditions of exclusive OR gates 92-1 through 92-7 and at least one of the conditions of gates 94-1 through 94-6 must be met before signal $\overline{\text{PCINC1}}$ may be developed.

INSTRUCTION REGISTER AND CONTROL

The instruction register and controls 19 and 20 are shown in Detail in FIG. 5 and function in a manner similar to the program counter and control circuits. Instruction register is comprised of four counters 97-1 through 97-4. Each of the counter stages receives parallel load inputs CB1-CB16 from the common bus 11 and generates terms IR1-IR12 which are returned at appropriate times to the common bus. Common bus outputs CB13-CB16 become the outputs IR13-IR16 respectively, and these are applied to the instruction decoder 16 for the purpose of ascertaining the particular instruction which has been transferred to the instruction register.

Instruction register increment signals are applied through gates 98 and 99; loading of the 8 least significant bits is controlled by gates 101; and control loading of the 8 most significant bits is controlled by gates 102 and 103.

Figure 3A:
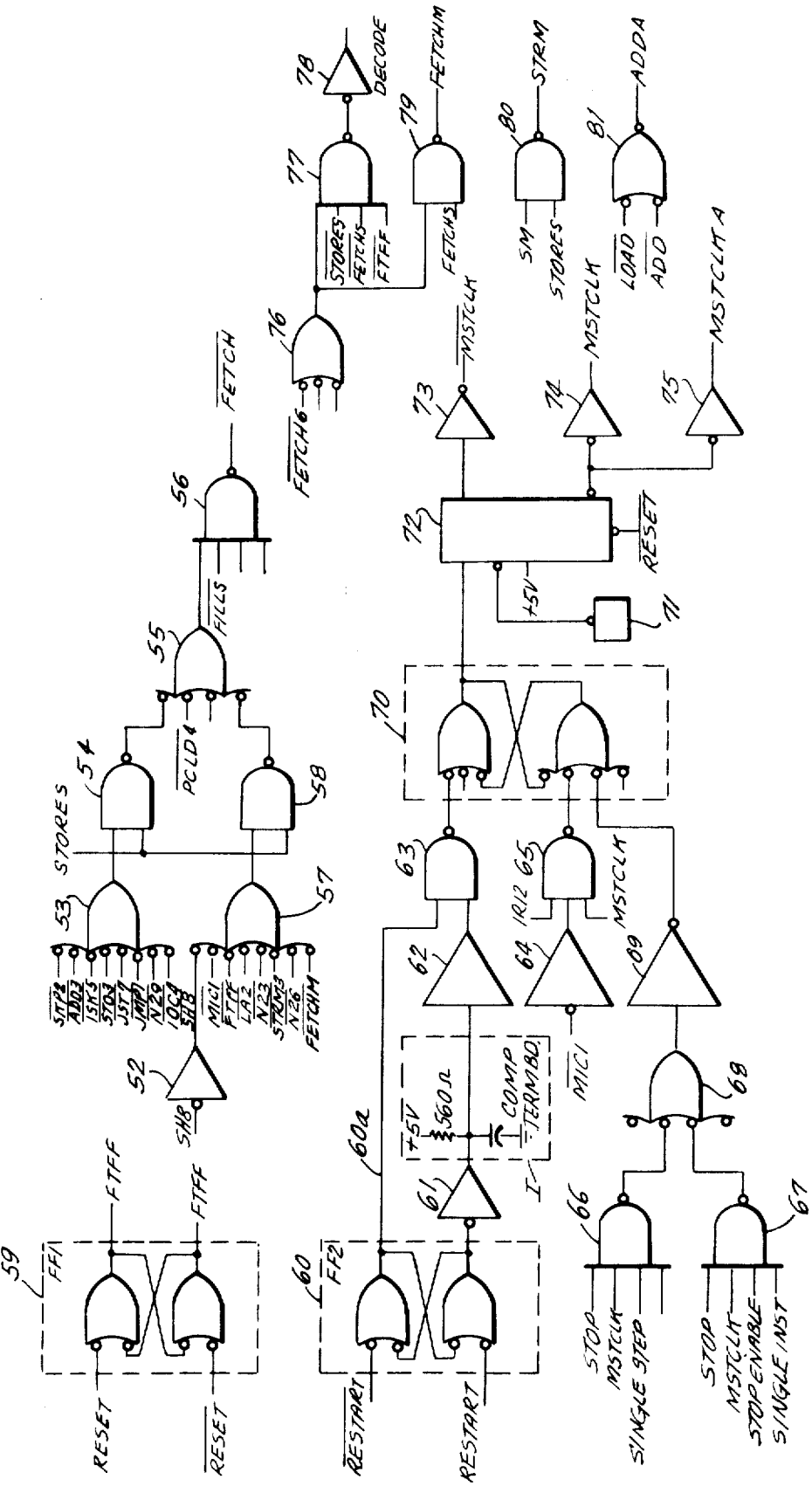

The instruction decoding and control circuits receive the outputs IR13-IR16 together with a Decode signal which is activated during FETCH 6 by means of gates 76, 77 and 78, shown in FIG. 3a. Instruction decoder comprises two octal decoder circuits 104-1 and 104-2 which provides the ability to decode one of the 16 inputs from the instruction register. Term IR13 selects the upper or lower 8 bits. When IR13 is high AND gate 105 is enabled when Decode is high to enable the decoding of signals IR14-IR16 of octal decoder 104-1. When IR13 is low the signal state is inverted at 106 and applied to AND gate 107 which is enabled when Decode is high, thereby causing octal decoder 104-2 to decode the binary state of inputs IR14-IR16. It can thus be seen that the four binary bits IR13-IR16 (which provide 16 different combinations) are decoded to produce one of 16 possible outputs at the pins 1-8 of either decoder 104-1 or 104-2.

IOC Instruction

The Input/Output Command (IOC) is used for all input/output operations and performs both data transfers and control functions. The operation code is $E_{16}$; it does not access memory, but instead causes any or all of a series of four pulses to be generated sequentially in the four clock times occupied by the instruction, and also generates 10 command decodes each of which can be combined with any of the four I/O timing pulses.

The operation code is decoded to produce $\overline{IOC}$ (FIG. 5) which is inverted to IOC and entered in the sequencer shift register (FIG. 3) when $\overline{PE}$ is generated in step Fetch 2 of the instruction. The parallel entry causes 10C1 to appear at the output of stages 45–8 of the sequencer in the first step of the Execute sequence. The logic 1 entered in the first stage of the sequencer is then shifted right by successive clock pulses to produce 10C2, 10C3, and 10C4. 10C1 is combined with IR9 in gate G–1 to produce timing pulse $\overline{TA}$, which is one clock time wide. The $\overline{TA}$ pulse is routed to gate 117 (FIG. 6c) where it causes ACCL to be generated, and thus clears the accumulator register. In the same way, if IR10 is set, complementary pulses $\overline{TB}$ and TB appear; 10C3 is combined with 1R11 to produce $\overline{TC}$ and TC, and 10C4 with 1R12 to produce $\overline{TD}$ and TD. 10C4 is applied to gate 53 (FIG. 3a) for the next Fetch.

Bits IR3–IR6 of the instruction word are applied to the binary-to-decimal decoder at 104, which produces a low at one of its 10 output terminals. The $\overline{I01}$ – $\overline{I09}$ decodes are inverted to I01–I09, and are then combined with the I/O timing pulses to set or reset flip-flops or to provide data transfer strobes.

ACCUMULATOR

The accumulator 22 is comprised of a full adder 25, accumulator register 24, multiplexer 23 and associated control circuitry as will be described hereinbelow.

FULL ADDER AND CONTROL

Full adder 25 is comprised of adders 110–1 through 110–4, each of which contains four adder stages having carry input and carry output. The full adder continually tracks the common bus (CB1 through CB16) and accumulator register (ACC1 through ACC16) with the outputs ($\Sigma$ 1 through $\Sigma$ 16) equaling the summation of the two sets of inputs. The $\Sigma$ outputs are applied to one input channel of the accumulator multiplexer 23 which will be more fully described hereinbelow in connection with FIG. 6b. It can be seen that the carry output C1, C2 and C3 of each of the stages 110–1 through 110–3 is respectively coupled to the carry input C(IN) of the stages 110–2 through 110–4, respectively. Provision is included to apply a binary "1" to the carry input of the first stage 110–1 in order to perform 2's complement arithmetic which occurs during the second clock cycle of the shift instruction (SH2) when a binary "1" in stage 9 of the instruction register enables gate 111 whose output is inverted at 112 to be applied to the carry in of stage 110–1.

ACCUMULATOR REGISTER AND CONTROL

The accumulator register 24 is comprised of 16 bistable flip-flops 113–1 through 113–6 (of which selected ones thereof have been omitted from FIG. 6c for purposes of simplicity) which are employed to store the contents of the accumulator. Inputs are derived from the accumulator multiplexer (MX1 through MX16 shown in FIG. 6b and to be more fully described) wherein both true and complement values of each are provided at the output of each of the stages 113. The leading edge of a high level applied to the T (toggle) inputs causes the MX value associated with each stage to be transferred to the ACC output while its complement is present at the $\overline{ACC}$ output. These values remain in the device until the next toggle occurs when outputs will change if the MX input value associated with each stage has changed. A direct clear (SC) input is available which clears each flip-flop with a low pulse or level applied.

The toggle inputs are generated by gates 114, 115 and inverters 116–1 through 116–4.

Direct clear inputs are generated by OR gate 117 and inverters 118–1 through 118–4. AND gates 119 and 120 provide active outputs (LOW) when the 8 least significant stages of the accumulator contain all zeros and when the 8 most significant stages of the accumulator contain all zeros ($\overline{ZEROLS}$ and $\overline{ZEROMS}$ respectively).

The accumulator multiplexer and control as shown in FIG. 6b is used to control the transfer of data within the accumulator. The multiplexer comprises 8 multiplexer circuits 121–1 through 121–8 each containing two multiplexer stages. For each stage one of four inputs is transferred to the output of its associated multiplexer based upon a 2-bit input code (S0 and S1). The selected input remains at the output so long as the input code remains active. The input codes and multiplexer actions are as follows:

a. S1 = 0 and S0 = 0. The levels on pins 12 and 4 of each multiplexer 121–1 through 121–8 are transferred to pins 15 and 1 respectively. With this input code the multiplexer follows the output of the full adder ($\Sigma$ 1 through $\Sigma$ 16).

b. S1 = 0 and S0 — 1. The levels on pins 11 and 5 are transferred to pins 15 and 1 respectively. This operation complements the word held in the accumulator register.

c. S1 = 1 and S0 = 0. The levels on pins 10 and 6 are transferred to pins 15 and 1 respectively. This code is used for shifting the contents of the accumulator to the left. Term SLIN (i.e. pin 10 of circuit 121–1) is active when the contents of the accumulator are being rotated to the left. This operation is enabled by the presence of IR10 at the inputs to gates 122 and 123. If accumulator register stage 16 is at the binary "1" level, gate 123 is enabled, providing a high to pin 10 of circuit 121–1. This shifts a "1" from the most significant accumulator stage to the least significant accumulator stage. If accumulator stage 16 is at binary "0", gate 123 is inhibited and a binary "0" is shifted in. If IR 10 is not programmed, zeros are shifted into the low end of the accumulator.

With this code the number of shift left (or rotate left) operations is determined by the number of binary ones present in the instruction register stages 1–8. It should be noted that as the sequencer 13 (see FIGS. 1 and 3) provide the outputs SH1 – SH8 to AND gates 124–8 through 124–1 respectively, individual gates are enabled if the corresponding instruction register active levels are present. These gates feed a wired OR function through OR gate 125 to inverter 126 and the S1–S0 code is produced by gates 127 and 128 respectively, depending on the presence or absence of terms IR12 and IR11 respectively. In effect, any S1–S0 code containing a HIGH can only be generated if one or more signals (IR1-IR8) are present at gates 124-8 through 124-1, respectively.

d. S1 = 1 and S0 = 1. This code provides shift right and rotate right operation and is the opposite of the shift left and rotate left operation described hereinabove. The principle difference is the application of the term SRIN to circuit 121-8 pin 7 if terminal ACC1 of flip-flop 113-1 in FIG. 6c is high during a right rotate operation at which time IR10 must also be high. The content of each stage is transferred to the right (in parallel) from one to eight times based on the content of instruction register (IR) stages 1-8.

MEMORY

FIG. 7 shows the memory 26 and its associated control circuits whose operation can be better understood from a consideration of the waveform timing diagram of FIG. 7a.

The input signals reset address and set address are applied to memory address register 27 simultaneously. The reset address signal over-rides causing the memory address register to be immediately cleared. After the reset address the signal times out, memory address contained on lines $\overline{CB1}$ through $\overline{CB12}$ is set into the memory address register from the common bus. Upon the occurrence of an initiate read signal applied to memory sequencer 26a-1 (which forms part of memory control 26a as shown in FIG. 1) address decoding circuit 26a-2 decodes the contents of memory address resistors 27 to generate the appropriate YX drive signals. After a fraction of a microsecond, the data at the selected address is available from memory data register 29 as a result of the enablement of sense amplifiers 26a-3 under control of sequencer 26a-1 to pick up and amplify the signals developed by the switched course. The data read out is applied through output buffer 29a to the output lines DB01 through DB08. The data remains in the memory data register until the next recycle is initiated.

The write phase is enabled when the term Initiate is applied to the memory sequencer. This term is active during various clock cycles of instructions and is not developed within the memory timing circuitry itself. During the write phase, output lines DB01 - DB08 are connected to lines DB11 - DB18 by way of the common bus (bits $\overline{CB1}$ - $\overline{CB8}$). In effect, the contents of the memory data register is thus returned to core memory. If the contents of the selected location are to be altered (or new) terms $\overline{CB9}$ - $\overline{CB16}$ are gated into the DB11-DB 18 lines.

The memory control circuits shown in FIG. 7b comprise AND gates and OR gates which develop all signals required to interface the controller with memory.

Common bus lines $\overline{CB1}$ - $\overline{CB16}$ are applied to one input of each of the respective AND gates 130-1 through 130-16 (certain ones of which have been omitted from FIG. 7b for purposes of simplicity). The gates are segregated into two groups and are enabled by signals MWRLS (memory write - least significant) and MWRMS (memory write - most significant). The output terms of the respectively segregated groups are ORed together through a wired OR configuration for application to memory inhibit drive circuits. Accordingly, the lower order or higher order CB (common bus) lines can be gated into memory during the write cycle.

The MWRLS is generated by OR gate 131 based on the presence of one of three inputs to gate 132 or any of the five inputs to gate 133.

The signal MWRMS is developed by gate 134. Gate 135 develops the Initiate Write signal.

The read cycle is initiated by inputs to OR gates 136 and 137 while the signal Initiate Read is developed by gate 138.

Gates 139 and 140 initiate the read operation by providing the set Address and $\overline{RESET\ ADDRESS}$ from gates 141 and 142, respectively. The various inputs to gates 136, 137, 132-134, 139 and 140 clearly indicate those cycle times within the various instructions that the memory is called upon to perform either a read or write operation.

Figure 8A:
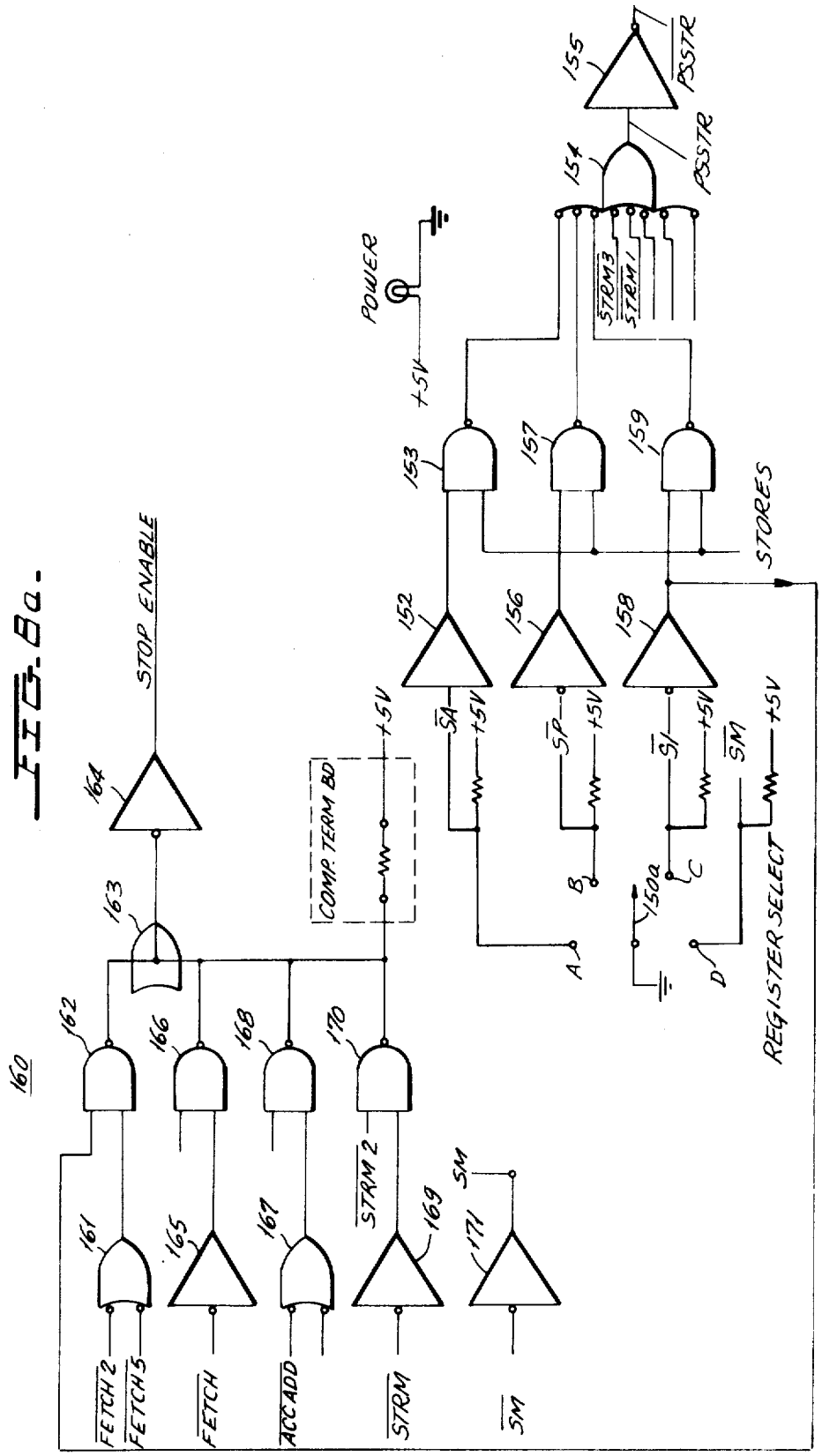

The manual control switch means and indicators are shown in FIG. 8 and include a series of manually operable switches and indicators together with logic to control normal operating and maintenance functions.

REGISTER SELECT SWITCH

The register select switch 150 is a four position switch for selecting the destination for data transfer from panel switches PS1 - PS16 which comprise the panel switch groups 151a and 151b respectively, to the accumulator, memory program counter or instruction register or for the display of the contents of one of these devices. When switch arm 150a contacts terminal A a signal SA is applied to inverter 152 which enables gate 153 to develop the signal $\overline{ACCADD4}$ when the STORES signal is present. This signal enables OR gate 154 and inverter 155 to develop the $\overline{PSSTR}$ (panel switches strobe) signal which couples the state of the panel switches (either +5 volts or ground) to the associated common bus input terminals (PS1 - PS 16 of FIG. 2), which signals are passed by the presence of signal $\overline{PSSTR}$ applied to OR gates 33, 35, 39, 40, 42 and 43 of FIG. 2, thereby placing the true and complement values of the panel switch states at the associated outputs of the common bus multiplexer stages 31-1 — 31-12 and 32-1 — 32- 4. The signal $\overline{ACCADD4}$ is also applied to OR gate 114 of the accumulator (see FIG. 6c) causing the output of the common bus stages to be inserted into the accumulator. It can be seen that a similar process is utilized for the remaining positions of the register select switch when the movable contact arm 150a electrically engages any of the stationary contacts B or C to respectively enable gates 157, 154 and 155 or gates 159, 154 and 155, respectively.

The logical circuitry 160 employed to generate Stop Enable signal is utilized for maintenance purposes. It is logic that makes it possible to display the contents of the instruction register at the end of the second stage of the FETCH cycle (FETCH 2), when the register select switch movable contact engages contact C, when the run stop switch 175 is in the stop position, when the single instruction step switch 176 is in the single step position and when the reset and restart switches 177 and 178 respectively, are in the RESET and RESTART positions, respectively.

When the controller enters into the FETCH 2 cycle gate 161 goes HIGH. At this time the output (SI) of inverter 158 is HIGH causing gate 162 to go LOW whereby inverter 164 causes STOP ENABLE to go high which signal is applied to gate 67 of FIG. 3a which is coupled through gate 68, inverter 69 and bistable circuit 70 to disable oscillator 71 from developing any further clock signals. Similar operation occurs during the FETCH 5 after the RESTART switch 178 has again been depressed.

Inverter 165 and gate 166 enables the controller to stop and display the contents of the program counter, gates 167 and 168 allows the controller to stop and display the contents of the accumulator and inverter 169 and gate 170 stops the controller and displays the word that should have been written into memory if it is operating properly.

Inverter 171 inverts the signal $\overline{SM}$ for use in generation of the $\overline{STRM}$ signal by gate 80 of FIG. 3a in order to initiate the sequencer store memory ($\overline{STRM}$ cycle).

The FETCH switch 181 develops the signal FETCHS a applied to gate 79 of FIG. 3a which is generated during the sixth stage of the FETCH cycle. This enables a new FETCH cycle when the store switch 180 is in the down position. The store switch further enables entry into the store memory cycle.

The run-stop switch enables the controller to be stopped in order to display the contents of the various registers. The run position permits individual instruction cycles to run through their normal sequence of clock times.

The single instruction - single step switch, in the single instruction position permits completion of a selected instruction before automatically stopping whereas the single step position enables the controller to be advanced one clock period at a time when the run - stop switch 175 is in the stop position. The logical gates employed for this operation are the gates 66 and 67 shown in FIG. 3a.

The fill switch 179 when in the position shown in FIG. 8 inhibits the generation of a FETCH cycle during external programming loading by means of a tape reader or other data source.

The restart switch 178 controls the operation of bistable flip-flop in the instruction sequencer timing control circuitry of FIG. 3a. When depressed the $\overline{RESTART}$ signal is applied to the flip-flop causing its output 60a to enable gate 63 of FIG. 3a. At this time output 60b of flip-flop 60 provides a low output which is inverted by inverter 61 whose output is applied to an integrating circuit I which begins charging in a positive direction. After a short delay, the output of inverter 62 goes low inhibiting gate 63 so as to provide a short low level pulse to the input of bistable flip-flop 70. Since oscillator 71 provides a square wave output to flip-flop 72, flip-flop 72 acts as a divider generating the signals mstclk, mstclk and mstclka through the inverters 73, 74 and 75, respectively. The clock is stopped when the output of either gate 65 or inverter goes HIGH. The $\overline{HALT}$ output signals gate 65 is produced during the presence of the signal $\overline{MICI}$ if stage 12 of the instruction register contains a binary "1" which is the program method of stopping the controller clock. The signal $\overline{MICI}$ is derived from the instruction sequencer register stage 45-7.

The reset switch 177 controls bistable flip-flop 59 of FIG. 3a which is applied to OR gate 49 of FIG. 3 for initiating the sequencer shift cycle.

The illuminated display circuitry 180 provides for display of the contents of the common bus arranged at the front panel of the controller.

CODE/MAP

The code/map circuitry contains an index register 500 (FIG. 16b), a shift register 501 (FIG. 16b), a bit pointer 502, and control circuits. This allows a bit string of any length to be coded or mapped. In coding operations the number of consecutive ones or zeros in the bit string are counted and the count is accumulated in the accumulator register; in mapping operations, a string of ones or zeros is written into memory, the length of the string being determined by a count previously loaded into the accumulator.

INDEX REGISTERS

There are two index registers; a 3-bit register 500a that specifies at which bit in a particular byte the coding/mapping is to start; and the byte index, an 8-bit register 500b that specifies the memory location of the first byte to be coded/mapped. The starting address is loaded into the index registers from the accumulator by a separate MAP instruction; after coding/mapping the finishing address can be transferred to the accumulator by another MAP instruction.

BIT POINTER

The bit pointer is a 3-bit counter 500a that protects any bits in the first byte that are not to be coded/mapped. The number loaded into the bit index is also loaded into the bit pointer, but in complementary form; as the byte is manipulated in the shift register, each shift increments the pointer, and when the pointer reaches the 1 1 1 state coding/mapping of the remainder of the byte is enabled.

SHIFT REGISTER (501)

Coding is performed by accessing and rewriting in memory successive data bytes beginning at the address specified by the index. Each data byte is loaded into the shift register and shifted right eight places; the least significant bit is sampled at each shift after the pointer has enabled counting to start, and the accumulator is incremented. During counting, the bit index is also incremented and each time it goes from 1 1 1 to 0 0 0 the byte index is incremented to set up the address of the next byte. If ones are being counted, the count is terminated by the first 0 encountered, and vice versa. On termination, the length of the string is specified by the count in the accumulator, and the bit and byte at which counting stopped is specified by the bit and byte index registers, and these data may be accessed by the program. Mapping is the mirror image of coding; the starting address is loaded into the index registers and the byte to be mapped is fetched and loaded into the shift register. As long as bits are to be saved, the byte is rotated right in the shift register; when mapping is enabled ones or zeros are shifted in. The byte is then rewritten in memory. The second and subsequent bytes access memory but the content is not examined; instead, ones or zeros are shifted into the shift register and when this is full the content is written into memory. Mapping stops when a number previously loaded into the accumulator has been counted down to zero; if termination is in the middle of a byte, the shift register is filled up with zeros and the final content is written into memory. The address of the last byte and the specific bit at which mapping stopped are then specified by the index registers, and the program can obtain this information by unloading the index registers into the accumulator.

DIRECT MEMORY ACCESS (DMA) CHANNEL

The DMA channel which is one channel coupled to the input-output control 30 of FIG. 1 handles video input from the Transceiver scanner during transmission, and video output to the printer during reception. DMA input or output operation is enabled by an IOC instruction; thereafter the video clock (a derivative of the master clock) raises a DMA request every 40 microseconds. When the request is granted at the conclusion of the current instruction, the DMA circuits either read a byte from memory into the DMA shift register for transmission to the printer, or store a byte of scanner information that has been assembled in the DMA shift register. DMA operations each require 3 microseconds to execute, and they continue until a 256-byte buffer in memory has either been filled with scanner data or emptied of printer data; when the last location in the buffer has been filled or emptied, a Line End Interrupt request is raised and when the request is granted control transfers to location 0004 which provides entry into a servicing routine. The DMA control circuits also generate signals that start and reset scanner sweep and printer sweep, and at line end advance the sweep by one step (in 200 lines/inch mode) or two steps (in 100 lines/inch mode).

MODEM CONTROLLER

The modem controller contains all the logic for transmitting and receiving compressed video data over a high-speed channel and error messages over a low-speed secondary channel. The primary channel consists of two 8-bit buffer/shift registers, and control circuitry. The secondary channel consists of a single 8-bit shift register with facilities for loading and unloading it in parallel format, a frequency divider that reduces the primary transmit/receive clock to the bit rate of the secondary channel, and control circuitry. Provision is made for setting or resetting control lines to the modem by IOC instructions, and for monitoring data set conditions by means of Skip instructions. When sending, buffer 1 of the primary channel is loaded in parallel from the accumulator via the common bus; when buffer 2 is empty the character is transferred into it from buffer 1 and shifted serially out to line. The transfer raises a modem interrupt flag; when the request is granted at the end of the current instruction, controls transfers to location 0002 which gives entry to a servicing routine that reloads buffer 1. When receiving, serial data from the modem is clocked into buffer 1; when the buffer is full, the assembled byte is transferred into buffer 2 and the modem interrupt flag is raised. The servicing routine then unloads buffer 2 into the accumulator for processing by the program.

SECONDARY CHANNEL

The secondary channel is employed primarily to synchronize the receiver and transmitter and to generate error indications. During the setup period, the secondary channel at the receiver goes to the spacing condition (producing a logic zero at the transmitting system) as soon as the paper reaches the print station in the receiving unit; this condition informs the transmitting unit that it may begin sending data. Thereafter, the receiving unit sends a logic 1 each time a transmission error is detected; after sending each line (256 bytes of data) the transmitting unit examines the secondary channel buffer content; if this is non-zero an error is assumed and an error count updated. When the error count is greater than 16 the content of the buffer is again examined and action is taken as follows:

1. If the buffer contains all-ones, the Remote-Unit Not Ready alarm is activated.
2. If the buffer contains alternating ones and zeros, the Call Remote Operator alarm is activated.
3. If the content is anything other than 1 or 2 above, the Excessive Error alarm is activated. In all three cases the transmitting unit terminates the page.

IOC CONTROL

The IOC control circuits are not a coherent functional entity, but consist of gates scattered throughout the DMA channel, modem controller, and transceiver interface. These gates AND-combine an instruction register term with one of the timing pulses generated by I/O instructions; the gate outputs initiate a complete operation or one step of an operation.

CODE Y.

The Code Y instruction reads successive bytes from memory, starting at a location (specified by the instruction) which is in an area of memory previously filled by a DMA operation. A search is made to determine the length of the string of ones or the string of zeros that begins in the first byte searched; as each byte is pulled out the count of ones or zeros is added to the accumulator, and this process continues until a bit of the opposite polarity is encountered. The instruction is then terminated. The total count of ones (or zeros) is held in the accumulator, and the byte and bit address at which termination took place is held in an index register. The count and address may be stored by the program for further processing.

The Code Y instruction has 12 steps, of which the first is used for initializing when the instruction is fetched; steps 2, 3 and 4 are used for control purposes; and steps 5–12 are used for counting the number of ones or zeros in a byte. If the bit string being counted extends over more than one byte, the $\overline{\text{RENTER}}$ signal is generated to allow the sequence to be re-entered at step 2 for the next byte. Upon termination of the count, the $\overline{\text{END}}$ signal is generated and causes the next instruction to be fetched. The Code Y instruction may be interrupted in step 12, and the interrupt prevents generation of the $\overline{\text{RENTER}}$ signal. If the interrupting source is the DMA channel, DMA3 generates $\overline{\text{RENTER}}$ 1 which allows the Code Y operation to be continued upon completion of the DMA operation. If the interrupting source is the modem or the Line End Signal, The Code Y instruction and data are saved before entering the subroutine.

FETCH 5.

In this step the operation code contained in bits IR12 – IR16 is decoded and the $\overline{\text{CODE}}$ signal is applied to OR gate M12 (FIG. 16a) and produces CDMP (Code or Map) at the stage 1 input of the Cpde/Map sequencer shift register H4, G4 and G5. When PE is generated, $\overline{\text{CDMP1}}$ appears at the output of the first stage. At the same time, $\overline{\text{CODE}}$ is applied to the Code/Map flip-flop and produces CODEF at the S18-3 output; this signal is used for selecting Code operations in hardware that is shared by both the Code and Map instructions.

The $\overline{\text{CDMP1}}$ signal resets the White Enable and Black Enable flip-flops N16–P16. In addition, the CDMPF flip-flop is tested to see whether or not this is the first pass through the instruction. If it is, the CDMPF is reset (by the end of the previous Code/Map instruction or by a manual reset). This allows the MEM ALERT A flip-flop (used only in the Map instruction) to be reset. Bit 2 of the instruction register (IR2), which determines whether or not the accumulator is to be cleared, is now interrogated. If it is set, the accumulator is cleared. This completes the initialization procedures for the instruction. After initializing, or if CDMPF is set (indicating that the instruction has been interrupted and is waiting for completion after a modem or Line End interrupt), step CDMP2 is entered.

CDMP 2

This step tests bit 3 of the instruction register to determine whether Black (ones in memory) or white (zeros in memory) is to be coded and reads the first byte to be coded from an address specified by a pre-loaded index register. If bit $\overline{\text{IR3}}$ is set, the combination of CDMP2 and IR3 sets the BLACK ENABLE flip-flop via gate N16b. If IR3 is not set, CDMP2 and IR3 set the WHITE ENABLE flip-flop via gate N16c. The operand address bits 1–8 are specified by bits IND4-IND11 which constitute the byte index, and are gated onto the auxiliary common bus bits 1–8 by INDEXSTRA; this signal, inverted to $\overline{\text{ACBSTR}}$ generates the S0, S1, and S2 multiplexer selection signals for the lower half of the common bus, and ACB1–ACB8 are gated onto CB1–CB8. The four most significant bits of the address are taken from bits 9–12 of the instruction register; this is accomplished by applying $\overline{\text{INDEXSTRA}}$ which gates IR9–IR12 onto common bus lines CB9–CB12. $\overline{\text{INDEX-STRA}}$ is also applied to gate in the memory timing circuits (FIG. 7) to generate RESET ADDRESS and INITIATE READ.

CDMP 3.

This step sets the CDMPF flip-flop, whose output alerts the interrupt circuits that a Code Y instruction is awaiting completion. Note that although the Code Y instruction may be interrupted at step CDMP 12, the CDMPF flop is not reset then; it can be reset only by an $\overline{\text{END}}$ signal denoting completion of the instruction, or by a manual reset signal.

CDMP 4.

Figure 16B:
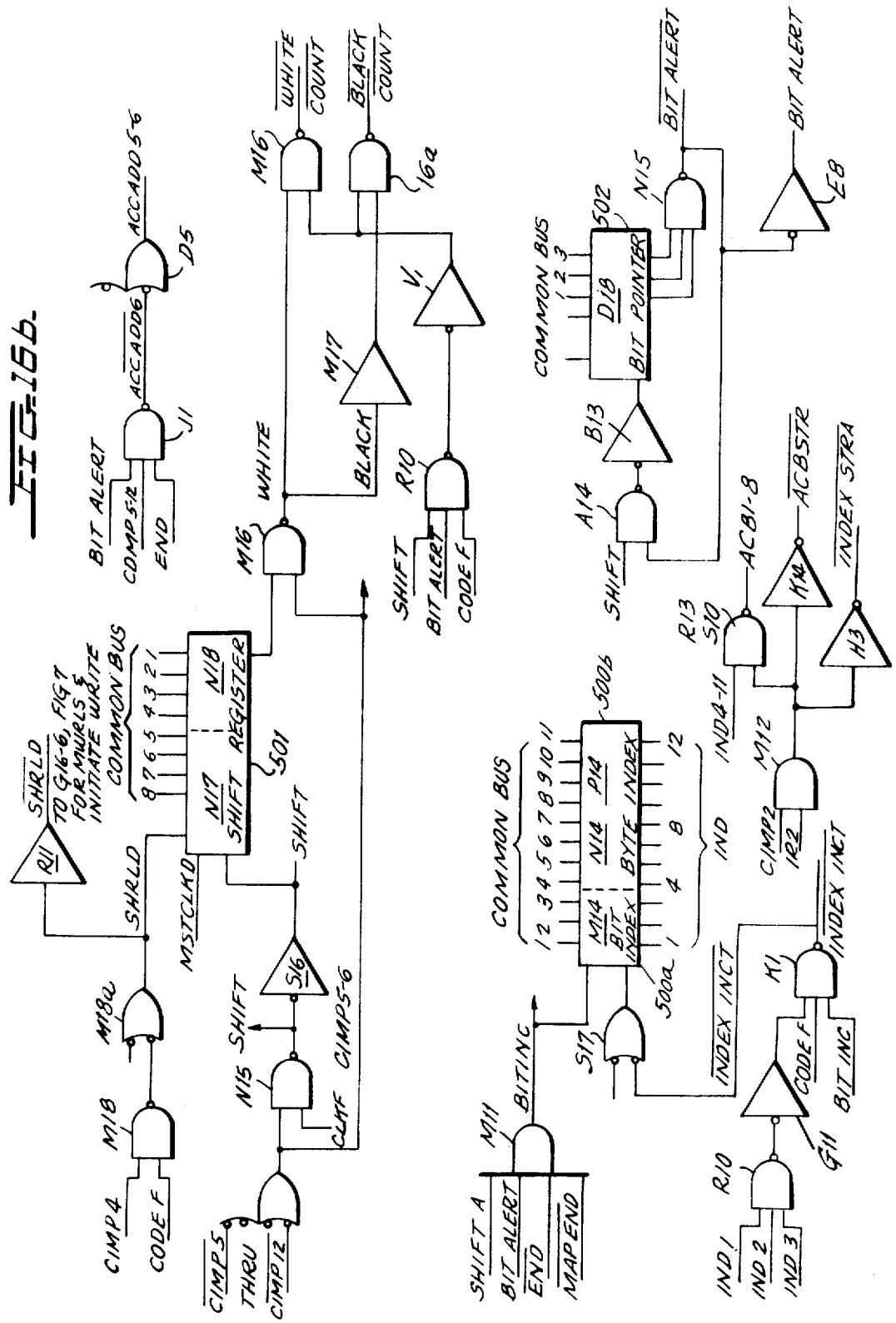

In this step the byte read from memory is placed on the common bus, from which it is rewritten into the same location and also loaded into a shift register for examination. The combination of CDMP4 and CODEF generates $\overline{\text{SHRLD}}$ via gates M18 and M18a, and inverter R11 (FIG. 16b). The $\overline{\text{SHRLD}}$ signal is applied to the memory timing circuits, where it generates $\overline{\text{MR}}$, which causes the multiplexer to gate the DBO lines onto common bus lines CB1–CB8. $\overline{\text{SHRLD}}$ also generates MWRLS (CB1–8 to DB11–8) and INITIATE WRITE. Thus the byte is rewritten into memory. The SHRLD signal enables parallel entry into the shift register, and on the following MSTCLKD pulse the data on the common bus lines (the byte to be examined) is loaded into the shift register. All initialization and control operations are now complete.

CDMP5 through 12.

During these eight steps the byte loaded into the shift register is sampled for content, bit by bit. The first N bits may be masked by loading the number N into a modulo-8 bit pointer in complemented form and inhibiting sampling until the bit pointer has counted up to the all-ones state. The action is as follows:

The least significant bit of the shift register is gated with the CDMP5–6 signal present throughout all 8 steps, and the byte is shifted right eight times so that all eight bits in turn generate either WHITE (high) or BLACK (low) at the output of gate M16-3. When the bit pointer terminates the masking action with BIT ALERT, gates M16–6 and M16–8 are enabled, and either $\overline{\text{WHITE COUNT}}$ or $\overline{\text{BLACK COUNT}}$ is generated; at the same time 1 is added to the accumulator. If white is to be counted, the appearance of $\overline{\text{BLACK COUNT}}$ resets the WHITE ENABLE flip-flop and generates $\overline{\text{END}}$, thereby terminating the instruction. Similarly, if black is to be counted, the appearance of $\overline{\text{WHITE COUNT}}$ resets the BLACK ENABLE flip-flop and generates $\overline{\text{END}}$. If the byte does not cause $\overline{\text{END}}$ to be generated, the output of gate S17 (FIG. 16a) remains HIGH and $\overline{\text{CDMP12}}$ enables gate M16 via inverter S16 and gates A8 and A14 generating $\overline{\text{RENTER}}$; each shift, as it occurs, increments the Bit Index at M14, and when the bit count is 7 (INDI–3=1 11) the next shift increments the Byte Index, so that the memory address is updated. $\overline{\text{RENTER}}$ is applied to stage 2 of the sequencer and to gate D14–8 to generate the parallel enable signal PE; thus on the next master clock pulse the Code Y sequence is re-entered at step CDMP 2. $\overline{\text{END}}$ resets CDMPF and generates a new Fetch.

MAP COUNT INSTRUCTIONS (MAP)

There are two map count instructions: B 305, Map Ones, and BB01, Map Zeros. The only difference between them in the CDMP sequence lies in the status of bit IR3 which determines whether ones or zeros are mapped. Prior to the start of any map count instruction, a starting address must be loaded into the index registers; also, the number of ones or zeros to be mapped must be loaded into the accumulator in complementary form. If the starting address contains any bits that are to be rewritten unchanged, the number of bits to be saved must be loaded in complementary form into the bit pointer by the index loading instruction. The content of the starting address is loaded into the shift register and is rotated right (LSB into MSB) until the bits to be saved have all been re-entered; thereafter, the saved bits are shifted toward the LSB and are followed by the ones or zeros to be mapped, which are counted by incrementing the accumulator at each shift. In addition, the bit index is incremented by each map count, and a flip-flop is set when the bit index goes from 1 1 1 to 0 0 0. After eight shifts (whether bit saving or map counting) the content of the shift register is gated onto the common bus and written into memory at the starting address. The map sequence is then re-entered at CDMP2, the next location is addressed, and ones or zeros are shifted into the shift register until another byte is complete. When the accumulator count reaches zero the counting process stops but shifting continues until the shift register is full (zeros are entered after counting stops). The instruction is terminated when the content of the shift register has been written to core in CDMP 4. The program may then execute a map control instruction to transfer the finishing address from the index registers into the accumulator.

INTERRUPT LOGIC

Either the paper tape punch or the typewriter can raise an interrupt request; the request is granted at the end of the current instruction unless a change of program reference bank is pending, in which case the granting of the interrupt request is delayed until the change has taken place. When the interrupt request is granted, location 002 of the current program reference bank is accessed for an instruction that transfers control to a servicing subroutine. The granting of an interrupt request disarms the interrupt logic to prevent the servicing routine from being interrupted. At the end of the servicing routine, a micro-instruction with bit 8 set rearms the interrupt logic after a delay of two further instructions which are normally the return instruction and one instruction of the main program. Identification and servicing of the interrupting device is performed by the servicing routine using skip instructions to test the various punch and typewriter flags. The following paragraphs describe the manner in which an interrupt request is inhibited or granted, the interrupt sequence that transfers control to the servicing routine, and the process of rearming the interrupt logic.

INTERRUPT REQUEST

When the punch requires service, it raises the PCHINT request signal; likewise, when the keyboard requires service, the SELINT request signal is raised (see FIG. 12). Note that any or all of these requests can be enabled or disabled under program control; the associated control logic is described in connection with the punch and typewriter interfaces. The and SELINT request signals are applied to NOR gate P12 and either signal drives the output of the gate low. Provided that $\overline{REARM}$ is also low, indicating that no other interrupt is being serviced, the output of gate P12 goes high and alerts the J input of the Interrupt flip-flop H5 via inverters K17 and D5. On the leading edge of the next master clock the negative transition of MSTCLK sets the interrupt FF and alerts one input of gate A10. If there is no interrupt inhibit ($\overline{INHINT}$ high) the STFTCH signal generated by the last step of the current instruction enables gate A10 and produces $\overline{INTA}$. This signal (low) disables gate F14 to inhibit the Fetch of the next instruction, enables parallel entry via gate H14 and inverters H13 and is applied to the input of stage 1 of sequencer module 45–15 (note also FIG. 3). On the trailing edge of the master clock, the machine enters into the Interrupt Sequence.

INTERRUPT INHIBIT

It is desirable to inhibit all interrupts when there is a program reference bank change pending. The change is enabled by a micro-instruction that penetrates either $\overline{SETPR1}$ or $\overline{SETPR2}$ ; either of these signals, in addition to alerting the program reference flag, also sets the latch consisting of V4 and S5, thereby driving $\overline{INHINT}$ low and disabling gate A10 to prevent generation of $\overline{INTA}$. The machine therefore continues fetching instructions until a JMP or JST instruction executes the reference change; then the PCLD signal that loads the PC with the jump address resets $\overline{INHINT}$ high, and at the conclusion of the JMP or JST gate A10 is enabled and the machine enters the Interrupt sequence.

INTERRUPT SEQUENCE

In step INTA 1 (see 45–15 of FIG. 3), location 002 in the selected program reference bank is accessed and the instruction held there is executed (normally a jump to the interrupt servicing routine). The $\overline{INTA1}$ signals force common bus lines CB1 and CB3–CB16 to zero by inhibiting all inputs (see gates 36 and 38 of FIG. 2). Multiplexer 31-2 is not inhibited, however, because $\overline{INTA1}$ holds the inhibit input low via gate 31–3a. Since no multiplexer address signals are generated, input 0 of the program counter is switched to line CB2; the input and CB2 are forced high, regardless of the status of PC2, because $\overline{INTA1}$ initiates a read operation at location 2 of the selected program reference bank. On the trailing edge of the master clock the machine enters INTA 2, which is an idle state, and on the next clock the machine enters step INTA 3.

INTA 3

The $\overline{INTA}$ 3 decodes the operation code of the instruction in location 2, loads the address portion of the instruction into the instruction register, locks out further interrupts, rewrites the instruction into location 2, and resets the Interrupt FF to allow execution of the instruction. The $\overline{INTA3}$ signal gates memory output lines DB01–DB016 onto common bus lines CB1— CB16 (see gates 33, 34, 35, 42 and 43 of FIG. 2). At the same time, DECODE is generated via gate 45—15a and inverter 45—15b; the instruction decode is applied to the appropriate sequencer module and parallel entry is enabled. Bits 1–12 of the instruction are applied to the parallel inputs of the instruction register. On the leading edge of the master clock the gate is enabled and the negative transition of $\overline{IRLD}$ loads the address into the instruction register. WINTPR, which initiates a write operation at location 2 of the program reference bank, is generated. $\overline{INTA1}$ resets the Interrupt FF to permit future Fetches.

INTERRUPT REARMING

The interrupt circuits can be rearmed only by a micro-instruction with bit 8 set. This instruction is normally inserted immediately before the return instruction. The MIC1 signal is gated with IR8 (see FIG. 5) in gate J17 and the output of this gate resets the ALENAB latch, driving ALENAB high. ALENAB removes the reset from flip-flops K16a and alerts the J input of K16. The DECODE of the next instruction alerts one input of gate J13 and the leading edge of MSTCLKA enables the gate; the negative transition at the output of this gate sets flip-flop K16; since the Q output of this flip-flop is low, K16a does not change state. When a further instruction is fetched, DECODE and MSTCLKA again clock both flip-flops K16 and K16a and this time, since the J input of K16a is now high, it changes state, driving $\overline{REARM}$ low and reenabling gate P12. If any further interrupt request from the tape punch or typewriter is waiting, the Interrupt flip-flop will be set on the next master clock leading edge.

READER INTERFACE

The paper tape reader (FIGS. 9 and 13) is a mechanical reader in which each of the head switches closes when there is a hole (logic 1) in the tape at the associated position. A closed head switch grounds the associated data line. An Out-of-Tape switch closes and grounds the $\overline{OUTTAPE}$ line when no paper tape is loaded into the reader. The reader interface operates in either of two modes; programmed mode, or Fill mode. In the programmed mode, two successive bytes of data are read into accumulator bits ACC9–ACC16 and then into ACC1–ACC8; two IOCx are required for this, each of which reads one byte and advances the reader. After each read instruction the program must check the Reader Available flag before issuing the next; and when the accumulator has been fully loaded the program must store or otherwise process the content of the accumulator. In the Fill mode, when the accumulator has been fully loaded the machine enters the Fill sequence which automatically stores the content of the accumulator and then increments the program counter; the machine waits until the reader is again available and then repeats the process.

PROGRAMMED MODE

Four IOC instructions read data from the paper tape reader: EB02, which generates TA, TB, and TD and loads reader data into accumulator bits ACC1–ACC8; ED02, which generates TA, Tc, and TD and loads reader data into the accumulator bits ACC9–ACC16; EA02 which adds reader data to the content of ACC1–ACC8 and propagates carries; and EC02 which adds reader data to the content of ACC9–ACC16, setting the link bit if there is an overflow from ACC16. The action is basically the same for all four instructions, the differences lying in whether or not $\overline{TA}$ is generated to clear the accumulator and in the common bus inhibit signals generated.

The EB02 instruction generates $\overline{TA}$, TB and TD. The $\overline{TA}$ signal alerts one input of gate E7 via gate E1 and the leading edge of MSTCLKB enables gate E7, thereby generating ACCCL via gate F4 to clear the accumulator. TB is gated with IR2 to generate ADD18 at the output of gate M13. ADD18 performs two functions:

1. It generates $\overline{ACCADDR}$ via gate N13, this signal generates S118 and S218 which together switch reader data lines TRD1–TRD8 to common bus lines CB1–CB8 and thence to the adder; since no accumulator multiplexer signals are generated, the summing outputs of the adder are routed to the accumulator register inputs, and since the accumulator was cleared, the summing outputs carry only the reader data. $\overline{ACCADDR}$ also generates S1912 and S2912, S11316 and S21316, which together switch data lines TRD1–TRD8 to common bus lines CB9–CB16 and thence to the adder and accumulator.

2. $\overline{ADD18}$ generates INH916 via gate K11–8 and thereby inhibits the multiplexers for common bus lines CB9–CB16; thus, when ACCADD is generated from $\overline{ACCADDR}$ via gates E2 and E7, only bits 1–8 of the accumulator are loaded.

The ED02 instruction generates $\overline{TA}$, TC, and TD. The $\overline{TA}$ signal clears the accumulator as described above. TC is gated with IR2 to generate $\overline{ADD916}$ at the output of gate M13. $\overline{ADD916}$ performs two functions;

1. It generates $\overline{ACCADDR}$ via gate N13; the resulting common bus multiplexer signals are identical to those generated by EB02 and described above.

2. $\overline{ADD916}$ generates INH18 via gate C10 and thereby inhibits the common bus multiplexers for CB1–CB8; thus when $\overline{ACCADD}$ is generated by $\overline{ACCADDR}$, reader data is loaded only into accumulator bits 9–16.

EA02 and EC02 INSTRUCTIONS

The EA02 instruction is identical to the EB02 instruction except that the accumulator is not cleared because $\overline{TA}$ is not generated. Thus the data on reader lines TRD1–TRD8 is added to the current content of accumulator bits 1–8; overflow from ACC8 is added to the current content of accumulator bits 1–8; overflow from ACC8 is added to the content of accumulator bits 9–16. The EX02 instruction is identical to the ED02 instruction except that $\overline{TA}$ is not generated; thus reader data is added to the current content of accumulator bits 9–16 and overflow from ACC16 sets the link bit.

READER ADVANCE

The reader advance signal is generated by gating IR2 with TD and MSTCLKB in gate B6; the resulting low at the gate output sets one-shot C2, which has a period of 4.5 milliseconds. The $\overline{RADVDR}$ signal at the Q output of C2 is applied to coil driver B1 to generate RADVDR, which energizes the reader advance solenoid. When the 4.5 millisecond period is completed, the one-shot reverts to its stable state, the solenoid is de-energized. The paper tape is advanced when the solenoid is energized.

READER AVAILABLE FLAG

A total of 20 milliseconds is required by the reader for mechanical action and recovery time. The leading edge of the reader advance drive signal RADVDR sets the 10-millisecond one-shot B2, and when this reverts to its stable state the negative transition at its Q output sets a second 10-millisecond one-shot A2. Two one-shots are employed instead of a single 20-millisecond unit to give quicker recovery time. Whenever either one-shot is set, so that $\overline{DLY1}$ or $\overline{DLY2}$ is low, or if the Out-of-Tape contact is closed indicating no tape in the reader, gate D1 gives a low output that forces flip-flop A7 to the $\bar{Q}$ state, and on the next master clock A72 is also reset, dropping the RAVFL flag signal. If there is tape in the reader, and the 20-millisecond delay period has been completed, the output of D1-6 goes high, releasing the forced-reset of A7. On the trailing edge of the next clock A7-3 is set, and one clock time later A7a is also set, thereby raising the RAVFL flag signal. This signal is applied to a skip multiplexer and may be tested by an SKP instruction. When the flag goes high, indicating that the reader is ready, the program may issue another IOC instruction to read paper tape data.

READER START FLAG

The program may also issue IOC read instructions when it has detected that the operator has pressed the READER START switch, located on the reader panel. Pressing this switch drops the IPLS line and sets the latch consisting of gates D4 and D4a, thereby raising the IPLA signal. When the switch is released the latch is reset. The positive transition of $\overline{IPLA}$ clocks D-flip-flop B4 to the $\bar{Q}$ state, thereby raising the IPL flag signal, which is routed to the skip multiplexer and may be tested by an SKP instruction. The first $\overline{RADVDR}$ signal generated by a reader IOC resets the Reader Start (IPL) flag via gate C4. The flag is also reset by $\overline{CLRA2}$ when a manual or automatic reset is given.

PUNCH INTERFACE

The punch interface operates in either of two modes; the programmed mode or the Dump mode. In the programmed mode, the accumulator is loaded from memory and an IOC transfers the contact of ACC9–ACC16 to the punch register via CB9–CB16. The punch is started, and when punching is complete the punch flag is raised and may be tested by a Skip if Punch Available instruction (code 0001); alternatively, a punch interrupt request may be generated and control transferred to a servicing routine. A second IOC transfers bits ACC1–ACC8 to the punch register via common bus lines CB9–CB16. Provision is made for enabling, clearing, and disabling the punch interrupt. To give extra flexibility, bits may be punched in the order in which they are stored in the accumulator (i.e., ACC1 and ACC9 punched in position 1 on the tape, ACC8 and ACC16 punched in position 8) or in reverse order (i.e., ACC1 and ACC8 punched in position 8, ACC9 and ACC16 punched in position 1). Reversal is achieved by generating timing pulse TD for each reverse-order punch IOC.

COPYBOARD LAMP DISPLAY CONTROL

The copyboard lamp display (FIG. 11) consists of eight 7-segment numerical indicators and four other indicator lamps. The numerical indicators are divided into three groups:

a. A 4-digit display 200 that indicates the current line length deficit in picas (tens and units) and points (0 or 10, and units).

b. A 2-digit display 201 (tens and units) indicating the code number of the type face currently in use.

c. A 2-digit display 202 that indicates in points (tens and units) the type size currently in use. Each 7-segment indicator is driven from a 4-bit buffer register through a BCD-to-7-segment decoder/driver. The buffer registers are loaded with BCD characters from the accumulator.

LINE LENGTH DISPLAY

The line-length display buffer (see FIG. 14) consists of counter modules H18, J18, K18, and flip-flop H17. The clock inputs (terminals 6 and 8) of each module are grounded to prevent counting action; the data strobe inputs (terminal 1) are all connected to the $\overline{LDLLD}$ line; this line is dropped to ground when execution of an E20C instruction causes gate F15 to be enabled by I03, TBX (a buffered version of $\overline{TB}$) and MSTCLK. The parallel inputs of the counter modules are connected to accumulator outputs ACC1–ACC4 (for the unit points digit), ACC5 (for the 0 or 10 points digit), ACC6–ACC9 (for the units picas digit), and ACC10–ACC13 (for the tens picas digit). The registers are cleared by $\overline{CLRA3}$ whenever a reset is generated at turn-on or by pressing the RESET switch. The parallel outputs of the registers are connected to the decoder/driver modules K6, M6, M5 and M4. Only the BCD 1 input of module M5 is driven (from flip-flop H17); the BCD 2, 4 and 8 lines are grounded so that the associated indicator can display only 0 or 1, depending on the status of the flip-flop. Power for the 7-segment indicator is supplied by the zener diodes shown on the left of the diagram; each zener diodes supplies power for one indicator unit.

STYLE AND SIZE DISPLAYS

The Style and Size displays operate in precisely the same manner as the Line Length display described above. The 8-bit Style buffer is loaded from ACC1–ACC8 when execution of an E40C instruction causes gate H15 to generate LDSTY; the Size buffer is loaded from ACC1–ACC8 when execution of an E80C instruction causes gate G15 to generate $\overline{LDSIZ}$.

HALF-POINT, TAB MODE, JUST ZONE, MIXED ZONE AND OVERSET INDICATORS

Each of these indicators consists of a lamp driven from a flip-flop. A1 the flip-flops are cleared by $\overline{CLRA2}$ when a reset is manually or automatically generated, and each flip-flop may be set or reset by a separate IOC instruction.

TYPEWRITER CONTROLLER

The typewriter is treated as two separate devices: the keyboard (for input), and the printer (for output). A separate interface is provided for each, and the auxiliary keyboard shares the typewriter keyboard interface. All data transfers to and from the keyboard and printer take place via bits 1–8 of the accumulator and the printer buffer or keyboard buffer. Flags that can be tested by Skip instructions indicate the status of various control functions, and the keyboard can also generate an interrupt request; the keyboard interrupt can be enabled or disabled under program control.

KEYBOARD INTERFACE

The keyboard interface accepts data from the typewriter character keys, function keys, and command keys of the Auxiliary Keyboard. Whenever a key is pressed, a code is generated and loaded into the keyboard buffer, and at the same time a flag is set to indicate to the program whether the code represents data (an alphanumeric character), a function command of group 1, or a function command of group 2. The following paragraphs describe in detail how a data code is generated and transferred to the accumulator; the description is supported by the simplified logic diagram shown in FIG. 15. The description of a data transfer is followed by additional information relating to the transfer of function commands.

KEYBOARD DATA

Figure 15:
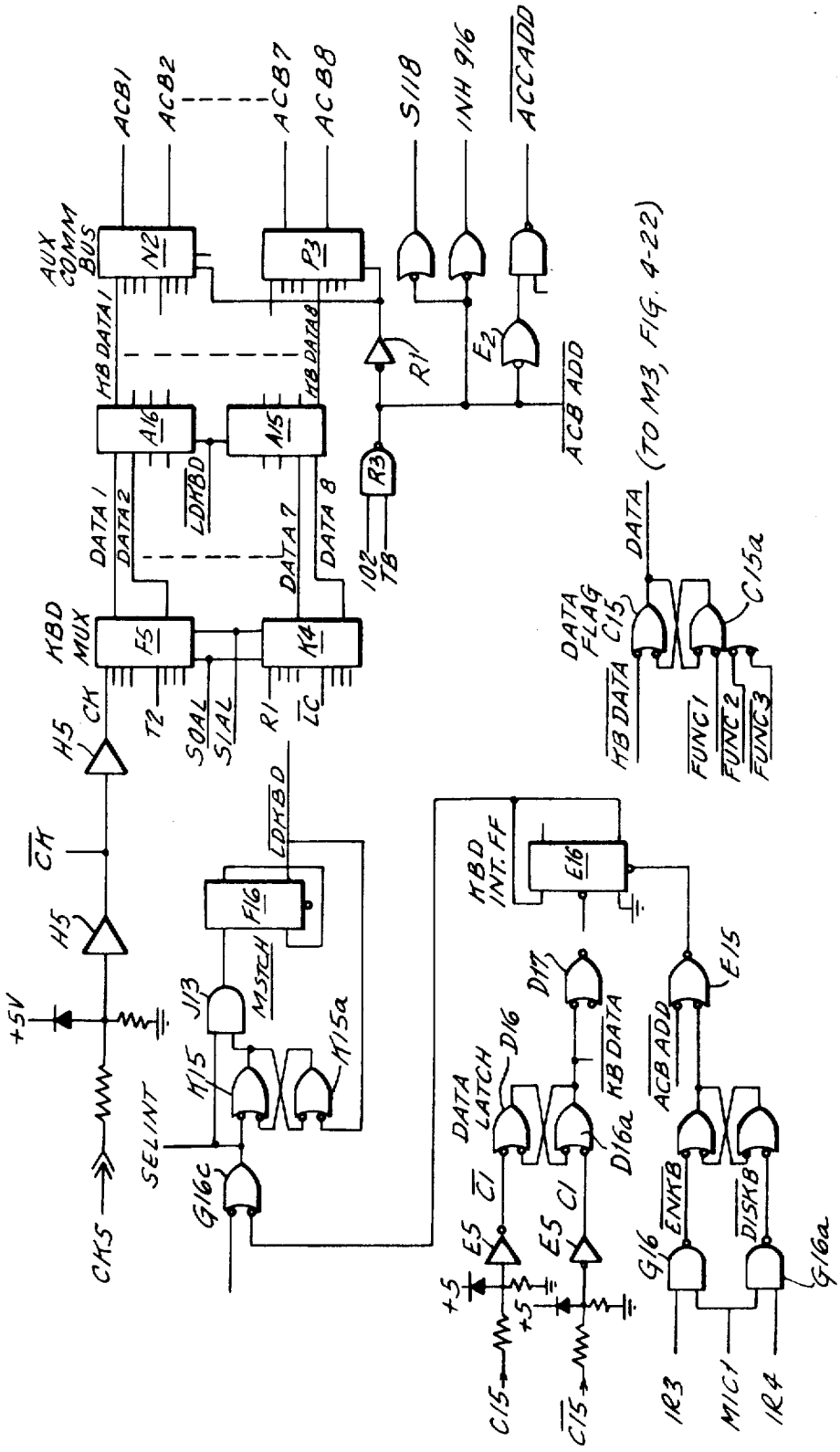
FIG. 15 is a schematic diagram useful in explaining the keyboard interface for the typewriter of FIG. 9.

The typewriter keyboard generates a 7-bit code for every alphanumeric lower case character; the Correspondence code used specifies rotation and tilt for the type element. If the Shift key is also pressed, to generate an upper case character code, the 8th bit is set. The seven switches operated by the keys are normally closed, applying a positive voltage to the associated output line; when a character key is pressed, the switches corresponding to binary 1's remain closed, but those corresponding to binary 0's open, removing voltage from the line. The switch line, of which CKS in FIG. 15 is typical, is applied to level converter circuits and inverters that produce complementary signals at TTL logic levels CK and $\overline{CK}$. The assertion outputs for character codes and the $\overline{LC}$ line (high to indicate upper case) are applied to four dual 4-input multiplexer modules F5, J5, K5, and K4. These data lines are applied to input 0, so that in the absence of selection signals S0AL and S1AL they are routed onto DATA1 through DATA8. Also, whenever any character key is pressed, the C1S and $\overline{C1S}$ lines from the keyboard change state, thereby setting the Data Latch with $\overline{KB\text{-}DATA}$ low.

The $\overline{KBDATA}$ signal performs two functions: it sets the Data Flag to indicate to the program that data in the keyboard buffer represents a character (not a function); and it sets the keyboard interrupt flip-flop and loads the keyboard buffer. The Data flag (C15 and C15a) is set directly by $\overline{KBDATA}$ and remains set until the pressing of a function key generates $\overline{FUNC1}$, $\overline{FUNC2}$, or $\overline{FUNC3}$; if any one of these signals goes low, a corresponding function flag (not shown in FIG. 15) is set and the Data Flag is reset. The flag outputs can be tested by Skip instructions. The negative transition of $\overline{KBDATA}$ sets the Keyboard Interrupt flip-flop E16 via gate D17, provided that the interrupt is not disabled by a forced reset from G16 of the Interrupt Enable latch. With the Keyboard Interrupt FF set, the $\overline{Q}$ output (E16) is low and raises SELINT via gate G16. At this time the latch consisting of K15 and K15a is set, with K15 high, so that the raising of SELINT enables gate J13 and arms the J input of FF F16; the trailing edge of the next master clock sets this flip-flop and the negative transition of $\overline{LDKBD}$ parallel loads keyboard buffer modules A15 and A16 from DATA1–DATA8. The character code now appears on buffer output lines KBDATA1–KBDATA7; KBDATA8 is set only if the shift key was pressed for an upper-case character. LDKBD resets the latch and disables gate J13 so that with its J input low and K input high, FF F16 is reset by the following master clock pulse.

The keyboard data circuits now wait until the program executes a Ready Keyboard IOC (code E208); then 102 and TB enable gate R3 to generate $\overline{ACBADD}$. This signal performs several functions:

a. It is inverted by R1–6 and the inversion enables the auxiliary common bus multiplexers, causing KBDATA1–KBDATA8 to be presented on ACB1–ACB8.

b. It generates S118 via gate J10, thereby causing the ACB lines to be switches onto common bus lines CB1–CB8.

c. It generates INH916 via gate K11, thereby inhibiting the upper half of the common bus and forcing CB9–CB16 to logic 0.

d. It alerts one input of gate E7 via gate E2; when the CLB clock pulse appears, E7 is enabled and generates $\overline{ACCADD}$, which strobes the summing outputs of the adder into the accumulator. Since the accumulator is not cleared by this instruction, the keyboard data arriving via the ACB and CB lines is added to the current content of ACC1–ACC8.

e. $\overline{ACBADD}$ resets the Keyboard Interrupt FF via gate E15; the positive transition of the $\overline{Q}$ output drops SELINT via gate G16 and sets the Load Enable latch with K15 high in preparation for the next character.

FUNCTION COMMANDS

The function command circuitry includes:

Function 1 which comprises Carriage Return, Space, Backspace, and Tab (all on Selectric keyboard), and Special Character, Typewriter Carriage Return, Spare 1 and Spare 2 (all on Auxiliary Keyboard); Function 2 which comprises Command key, Quad Left, Quad Right, Quad Center, Quad Middle, Em Space, En Space, and Thin space (all on auxiliary keyboard). Function 3 which comprises miscellaneous functions such as Index, Parity Check, and others, on the typewriter Keyboard. Depressing any function key on the keyboard or auxiliary Keyboard sets the associated function flag and resets the data flag and other function flags, and raises the SELINT interrupt signal via function interrupt flip-flop E16. Thereafter, keyboard loading, data transfer, and interrupt resetting takes place in the manner as described above.

PRINTER INTERFACE

The printer interface consists of a printer buffer, loaded from accumulator bits 1–7, buffer loading circuits, coil drivers, control latches, and a printer busy flag. FIG. 16 is a simplified logic diagram showing the essential logic for loading the buffer and printing a character.

PRINTING A CHARACTER

The character code is loaded into the accumulator (bits 1–7) and the program then executes a Print Character IOC, code E824. The 109 and TD signals produced by this instruction enable gate A17 and arm the J input of the Data Out flip-flop A18. The 109TD output of the gate enables gate A17 of which one input is already alerted by the $\overline{DATAOUT}$ signal from the flip-flop; the output of gate A17 goes low and clocks the data presented on the accumulator outputs into printer buffer modules G18 and F18. On the trailing edge of the next MSTCLKE pulse, flip-flop A18 is set, driving $\overline{\text{DATAOUT}}$ low; this removes the buffer loading signal and at the same time raises the PRINTBSY line via gate B17, inverter B16 and gate C16. The PRINTBSY line may be tested by a Skip instruction.

With the buffer loaded, the code is applied to the typewriter solenoids via inverters and coil drivers (N17 and C2A for the CK bit are typical of the remainder). The coils remain energized until the print cycle is under way; then the typewriter generates a feedback signal (FUNCA or FUNCB according to the operation initiated) which remains high until the operation is complete. FUNCA sets latch G17 and G17a; FUNCB sets latch G17b and G17c; the setting of either latch drops the $\overline{\text{KBBSY}}$ line via gate F17 and inverter B16. $\overline{\text{KBBSY}}$ performs three functions:

a. It generates SELRSTC via gates A17 and E15, and thereby clears the printer buffer and releases the typewriter solenoids.

b. It generates SELRSTB via gates A17 and E15. SLRSTB (low) resets the Data Out flip-flop.

c. SELRSTB (low) also maintains PRINTBSY high. When the typewriter print cycle is complete the feedback signal changes back to its original state (FUNCA or FUNCB low, $\overline{\text{FUNCA}}$ or $\overline{\text{FUNCB}}$ high), thereby resetting the associated latch and driving $\overline{\text{KBBSY}}$ high; SERLSTB also goes high, thereby dropping the PRINTBSY signal and removing the forced reset from the Data Out FF to allow a new print instruction.

PRINTER CONTROL FUNCTIONS

Printer control functions are performed in the same manner as character printing, except that the command signal generated by the IOC arms the J input of a flip-flop similar to the Data Out FF and the FF is set on the trailing edge of the next master clock pulse. The control flip-flop outputs are routed to the appropriate coil drivers, and the flips are reset by one of the SELRST signals when FUNCA or FUNCB goes high to indicate the function is under way. The PRINTBSY signal is raised by the FF output and is maintained by $\overline{\text{KBBSY}}$ until FUNCA or FUNCB goes low to indicate completion of the function. A number of functions (such as Upper/Lower Case, Red/Black Ribbon, etc) are two-magnet operations; the control FF's for these functions are interlocked to ensure that (say) a Black Ribbon command does not needlessly energize the Black solenoid if the machine is already in the Black Ribbon state.

The photocomposing Keyboard system, with its attendant software, is designed to perform text editing functions for a photocomposing machine. The program and its lookup tables are stored into memory via the paper tape reader. The raw text is then entered via the typewriter keyboard and the auxiliary keyboard allows entry of typesetting parameters such as line length, type style, and type size, as well as control commands for insertion of fixed-width spaces and for margin alignment. Lamp display 210 (FIG. 11) keeps the operator informed of the amount of space left in the line, and indicates when justification of the line is possible. When the operator terminates the line with a Carriage Return character, the controller performs justification calculations and outputs paper tape (406 of FIG. 9) containing the characters and the justification data in a form compatible with the composing machine in use. The paper tape is removed and is used as the input to the photocomposing machine (407). However, the versatility of the Controller is such that the keyboard can be adapted to almost any task that requires the translation of one paper tape code to another or the outputting of paper tape from keyboarded data.

INPUTS

The program and lookup tables for character widths and other photocomposing data are loaded via paper tape. Initial program loading into a blank core is performed in the Fill mode, however, the program includes a bootstrap loaded routine for loading format tapes, and once this routine is resident in core the operator can load format tapes under program control without going to the Fill mode. Data is input via the selectric keyboard and the auxiliary command keyboard.

PROCESSING

The system accepts raw text from the typewriter keyboard, one line at a time, performs all calculations necessary to justify the line, and converts the interior machine language character code into a code that is compatible with the composing device in use. Keyboarded characters appear on the typewriter printer as they are entered, in black for text and in red for control data. The justified line is outputted to a paper tape punch and contains complete character identification and space width data to enable the photocomposing machine to produce justified text. Lamp displays indicate to the operator the typesetting parameters in use, show when the line is justifiable by interword spacing or by both interword and intercharacter spacing, and give warning of an overset line.

OUTPUTS

Hard copy, containing all text and control characters keyboarded by the operator, is produced by the typewriter printer. When justification calculations have been performed for a line of text, the line is punched on paper tape (including all control data required by the photocomposer).

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows 1. A controller comprising:
    a clock source;
    instruction sequencer means for sequentially controlling a plurality of controller operations;
    program counting means for counting program steps, said program counting means including means for storing program steps;

instruction register means for storing an instruction word;

decoder means for decoding the operation called for in the instruction stored in said instruction register;

said sequencer means including a plurality of shift registers each storing a group of sequentially controlled signals;

means coupling said decoder means to a selected one of said sequencer registers dependent upon the operation called for by the instruction in said instruction register;

said clock means being coupled to said sequencer means for sequentially shifting out the sequential control signals from the selected register;

accumulator means;

memory means;

input-output control means for coupling data from peripheral circuitry to said controller;

common bus means having input means coupled to the outputs of said instruction register, said program counter and said memory means; said accumulator means and said input-output control means;

said common bus means including output means and multiplexer means for selecting the input to be passed to the output means of said common bus;

means coupling said instruction sequencer to said common bus means multiplexer for selecting the input to be passed by the output of said common bus means;

means coupled to said instruction sequencer means for selectively coupling the output of said common bus means to one of said memory means, said accumulator means, said instruction register means, program counter means; said accumulator means and said input-output control means selectively in accordance with the sequential control signal developed by said sequencer means.

2. The controller of claim 1 wherein said instruction sequencer further comprises a fetch register for sequentially developing a plurality of fetch signals when actuated to cause the next program step to be performed;

means coupled to the last control signals of selected ones of said sequencer means shift registers for actuating said fetch register.

3. The controller of claim 2 wherein said input-output control means comprises means coupled to said sequencer means for operating said peripheral circuits.

4. The controller of claim 2 further comprising:

display means means for displaying output information coupled to said input-output control means;

printer means including keyboard means coupled to said input-output control means;

external data source means coupled to said input-output control means;

output recording means coupled to said input-output control means;

said input-output control means including means coupled to said sequencer means for transferring the output of said common bus means to one of said printer means, output recording means or display means;

said input-output control means further comprising means coupled to said sequencer means selectively coupling one of said external data source means and said printer keyboard means to said common bus for entering data to be converted into said controller.

5. The controller of claim 4 wherein said keyboard means is adapted to insert characters and other symbols into said controller in binary form; said accumulator means being responsive to data from said external data source and said character information for determining the amount of characters which can be accommodated in a line of print;

said display means comprising means for displaying the space remaining in the line of print being entered;

said recording means being adapted to print an output representing the spacing and positioning of the characters in each line of print for use in controlling a justifier.

6. The controller of claim 1 further comprising means for scanning an image; means for converting each scanned point of said image into signals each representing one of two binary states;

means coupling said converting means to said input-output control means for sequentially entering said signals into said accumulator in groups, each group containing a plurality of said signals;

means coupled between said sequencer means and said accumulator means for counting the number of consecutive signals of the same binary state;

means coupled to said accumulator means for terminating said count when the next consecutive signal is of the opposite state to start a new count;

means coupled between said accumulator and said input-output control means for outputting each completed count in the form of binary signal groups to said input-output means for transmission to a remote location.

7. The controller of claim 6 further comprising means for receiving the binary signal groups representing said counts;

second controller means including means coupled to said receiving means for converting said signal groups into binary signals representing the original form of said binary signals representing said image prints;

means coupled to said second controller means for generating a line whose contrast values are determined by the state of the binary signals representing the image points scanned by said scanning means.

* * * * *